US012592199B2

(12) United States Patent
Yu et al.

(10) Patent No.: US 12,592,199 B2
(45) Date of Patent: Mar. 31, 2026

(54) DRIVING CIRCUIT, DRIVING METHOD, PIXEL CIRCUIT, DISPLAY PANEL AND DISPLAY DEVICE

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Ziyang Yu, Beijing (CN); Haijun Qiu, Beijing (CN); Ming Hu, Beijing (CN); Zhiliang Jiang, Beijing (CN); Qingqing Yan, Beijing (CN); Quanyong Gu, Beijing (CN); Tianyi Cheng, Beijing (CN); Jianpeng Wu, Beijing (CN); Tiaomei Zhang, Beijing (CN); Wenbo Chen, Beijing (CN); Pan Zhao, Beijing (CN); Qi Wei, Beijing (CN); Qian Li, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 18 days.

(21) Appl. No.: 18/686,657

(22) PCT Filed: Mar. 29, 2023

(86) PCT No.: PCT/CN2023/084683
§ 371 (c)(1),
(2) Date: Feb. 26, 2024

(87) PCT Pub. No.: WO2024/197636
PCT Pub. Date: Oct. 3, 2024

(65) Prior Publication Data
US 2024/0331643 A1 Oct. 3, 2024

(51) Int. Cl.
*G09G 3/3266* (2016.01)
*G09G 3/3225* (2016.01)
*G09G 3/3233* (2016.01)

(52) U.S. Cl.
CPC ......... *G09G 3/3266* (2013.01); *G09G 3/3225* (2013.01); *G09G 3/3233* (2013.01);
(Continued)

(58) Field of Classification Search
None
See application file for complete search history.

(56) References Cited

U.S. PATENT DOCUMENTS

2021/0104550 A1 4/2021 Do
2021/0134225 A1* 5/2021 Bai ...................... G09G 3/3258

FOREIGN PATENT DOCUMENTS

CN 1221206 A 6/1999
CN 1702727 A 11/2005
(Continued)

*Primary Examiner* — Brian M Butcher
(74) *Attorney, Agent, or Firm* — MUNCY, GEISSLER, OLDS & LOWE, P.C.

(57) ABSTRACT

A driving circuit, a driving method, a pixel circuit, a display panel and a display device are provided. The driving circuit includes a first switching circuit and a scanning signal generation circuit; the first switching circuit is electrically connected to a first gating control line, at least two data output terminals of a source driver and the scanning signal generation circuit, and is configured to write a data signal provided by the at least two data output terminals into the scanning signal generation circuit under the control of a first gating control signal provided by the first gating control line; the scanning signal generation circuit is configured to generate a scanning signal according to the data signal, and output the scanning signal through the scanning signal output terminal.

14 Claims, 31 Drawing Sheets

(52) U.S. Cl.
CPC ............... *G09G 2300/0842* (2013.01); *G09G 2310/061* (2013.01); *G09G 2310/08* (2013.01); *G09G 2330/021* (2013.01)

(56) References Cited

FOREIGN PATENT DOCUMENTS

| | | | |
|---|---|---|---|
| CN | 1866340 | A | 11/2006 |
| CN | 103238177 | A | 8/2013 |
| CN | 103282954 | A | 9/2013 |
| CN | 103856206 | A | 6/2014 |
| CN | 104123963 | A | 10/2014 |
| CN | 104392686 | A | 3/2015 |
| CN | 105139803 | A | 12/2015 |
| CN | 105763184 | A | 7/2016 |
| CN | 105810167 | A | 7/2016 |
| CN | 106169280 | A | 11/2016 |
| CN | 108682396 | A | 10/2018 |
| CN | 109767726 | A | 5/2019 |
| CN | 110164351 | A | 8/2019 |
| CN | 111835338 | A | 10/2020 |
| CN | 112863586 | A | 5/2021 |
| CN | 215341901 | U | 12/2021 |
| CN | 114512095 | A | 5/2022 |
| CN | 115331644 | A | 11/2022 |
| JP | H05343980 | A | 12/1993 |
| JP | 2006350304 | A | 12/2006 |
| JP | 2016029863 | A | 3/2016 |
| KR | 20010084970 | A | 9/2001 |
| TW | 201924223 | A | 6/2019 |

* cited by examiner

DRIVING CIRCUIT, DRIVING METHOD, PIXEL CIRCUIT, DISPLAY PANEL AND DISPLAY DEVICE

CROSS-REFERENCE TO RELATED APPLICATION

The present disclosure is the U.S. national phase of PCT Application No. PCT/CN2023/084683 filed on Mar. 29, 2023, which are incorporated herein by reference in their entireties.

TECHNICAL FIELD

The present disclosure relates to the field of display technology, in particular to a driving circuit, a driving method, a pixel circuit, a display panel and a display device.

BACKGROUND

Organic light-emitting diode (OLED) display technology has the advantages of high contrast, fast response, and low power consumption. In order to further reduce power consumption, the Low Temperature Polycrystalline Oxide (LTPO) display technology realized by the combination of Low Temperature Polycrystalline Silicon (LTPS)+Indium Gallium Zinc Oxide (IGZO) can achieve low frame rate display, and reduce the driving power consumption by reducing the repeated refresh of static images. However, when the existing OLED display updates the image, it still needs to initialize and write all the pixel voltages in one frame. In some special images, the voltage of most of the pixels on the whole screen does not need to be updated, that is, the original display brightness can be maintained by the LTPO thin film transistor (TFT) with low current leakage, and the repeated flashing of these pixels causes a waste of data line power consumption.

SUMMARY

In one aspect, the present disclosure provides in some embodiments a driving circuit, including a first switching circuit and a scanning signal generation circuit; the first switching circuit is electrically connected to a first gating control line, at least two data output terminals of a source driver and the scanning signal generation circuit, and is configured to write a data signal provided by the at least two data output terminals into the scanning signal generation circuit under the control of a first gating control signal provided by the first gating control line; the scanning signal generation circuit is configured to generate a scanning signal according to the data signal, and output the scanning signal through the scanning signal output terminal.

Optionally, the at least two data output terminals are electrically connected to different columns of data lines included in a display panel respectively; a scanning signal output terminal of the scanning signal generation circuit is electrically connected to a column of scanning line included in the display panel.

Optionally, at least two data output terminals are electrically connected to different data lines included in a display panel respectively; a scanning signal output terminal of the scanning signal generation circuit is electrically connected to two columns of scanning lines included in the display panel respectively.

Optionally, the driving circuit further comprises a second switching circuit; the second switching circuit is electrically connected to a second gating control line, the at least two data output terminals of the source driver and at least two data lines included in a display panel respectively, and is configured to control to connect or disconnect the at least two data output terminals of the source driver and a column of data line included in the display panel respectively under the control of a second gating control signal provided by the second gating control line; the first gating control line is a same gating control line as the second gating control line, or the first gating control line is different from the second gating control line.

Optionally, the first switching circuit is respectively electrically connected to the first gating control line, a (2m−1)th data output terminal of the source driver, a 2mth data output terminal of the source driver, a first control node and a second control node, is configured to control to connect or disconnect the (2m−1)th data output terminal and the first control node and control to connect or disconnect the 2mth data output terminal and the second control node under the control of the first gating control signal provided by the first gating control line; m is a positive integer.

Optionally, the first switching circuit includes a first transistor, a second transistor, a first capacitor and a second capacitor; a gate electrode of the first transistor is electrically connected to the first gating control line, a first electrode of the first transistor is electrically connected to the (2m−1)th data output terminal, and a second electrode of the first transistor is electrically connected to the first control node; a gate electrode of the second transistor is electrically connected to the first gating control line, a first electrode of the second transistor is electrically connected to the 2mth data output terminal, and a second electrode of the second transistor is electrically connected to the second control node; a first terminal of the first capacitor is electrically connected to the first control node, and a second terminal of the first capacitor is electrically connected to a control voltage terminal; a first terminal of the second capacitor is electrically connected to the second control node, and a second terminal of the second capacitor is electrically connected to the control voltage terminal.

Optionally, the scanning signal generation circuit includes an output control circuit and a first output circuit; the output control circuit is electrically connected to the first control node, a first voltage terminal, a second voltage terminal, an output control terminal and a scanning output terminal respectively, is configured to control to connect or disconnect the output control terminal and the first voltage terminal under the control of a potential of the first control node, and control to connect or disconnect the output control terminal and the second voltage terminal under the control of a signal provided by the scanning output terminal; the first output circuit is electrically connected to the second control node, the output control terminal, the scanning output terminal, the first voltage terminal and the second voltage terminal respectively, and is configured to control to connect or disconnect the scanning output terminal and the first voltage terminal under the control of a potential of the second control node, and control to connect or disconnect the scanning output terminal and the second voltage terminal under the control of a potential of the output control terminal.

Optionally, the scanning output terminal is the scanning signal output terminal; or the scanning signal generation circuit further includes an inverting circuit; an input terminal of the inverting circuit is electrically connected to the scanning output terminal, an output terminal of the inverting circuit is electrically connected to the scanning signal output terminal, and the inverting circuit is configured to perform phase inversion on a voltage signal that is connected to the input terminal of the inverting circuit, obtains an inverted voltage signal, and outputs the inverted voltage signal through the output terminal of the inverting circuit.

Optionally, the output control circuit includes a third transistor and a fourth transistor; a gate electrode of the third transistor is electrically connected to the first control node, a first electrode of the third transistor is electrically connected to the first voltage terminal, and a second electrode of the third transistor is electrically connected to the output control terminal; a gate electrode of the fourth transistor is electrically connected to the scanning output terminal, a first electrode of the fourth transistor is electrically connected to the output control terminal, and a second electrode of the fourth transistor is electrically connected to the second voltage terminal; the output circuit includes a fifth transistor and a sixth transistor; a gate electrode of the fifth transistor is electrically connected to the second control node, a first electrode of the fifth transistor is electrically connected to the first voltage terminal, and a second electrode of the fifth transistor is electrically connected to the scanning output terminal; a gate electrode of the sixth transistor is electrically connected to the output control terminal, a first electrode of the sixth transistor is electrically connected to the scanning output terminal, and a second electrode of the sixth transistor is electrically connected to the second voltage terminal.

Optionally, the scanning signal generation circuit includes a first output control circuit, a second output control circuit, a third output control circuit, a fourth output control circuit and a second output circuit; the first output control circuit is electrically connected to the first control node, a third control node and a connection node respectively, and is configured to control to connect or disconnect the third control node and the connection node under the control of the potential of the first control node; the second output control circuit is electrically connected to the second control node, a fourth control node and the connection node respectively, and is configured to control to connect or disconnect the fourth control node and the connection node under the control of a potential of the second control node; the third output control circuit is electrically connected to the scanning output terminal, an output control terminal, a first voltage terminal and the third control node respectively, and is configured to control to connect or disconnect the output control terminal and the first voltage terminal under the control of a signal provided by the scanning output terminal, and control to connect or disconnect the output control terminal and the third control node; the fourth output control circuit is electrically connected to the output control terminal, the scanning output terminal, the first voltage terminal and the fourth control node respectively, and is configured to control to connect or disconnect the scanning output terminal and the first voltage terminal, and control to connect or disconnect the scanning output terminal and the fourth control node under the control of the output control signal provided by the output control terminal; the second output circuit is electrically connected to the scanning output terminal, the first voltage terminal, the second voltage terminal and the scanning signal output terminal respectively, is configured to control to connect or disconnect the scanning signal output terminal and the first voltage terminal, and control to connect or disconnect the scanning signal output terminal and the second voltage terminal under the control of the signal provided by the scanning output terminal.

Optionally, the connection node is electrically connected directly to the second voltage terminal; or the scanning signal generation circuit further includes a connection control circuit, a fifth output control circuit and a sixth output control circuit; the connection control circuit is electrically connected to a third gating control line, the connection node and the second voltage terminal respectively, and is configured to control to connect or disconnect the connection node and the second voltage terminal under the control of a third gating control signal provided by the third gating control line; the fifth output control circuit is electrically connected to the third gating control line, the first voltage terminal and the output control terminal respectively, and is configured to control to connect the first voltage terminal and the output control terminal under the control of the third gating control signal; the sixth output control circuit is electrically connected to the third gating control line, the first voltage terminal and the scanning output terminal respectively, and is configured to control to connect the first voltage terminal and the scanning output terminal under the control of the third gating control signal.

Optionally, the first output control circuit includes a seventh transistor, and the second output control circuit includes an eighth transistor; a gate electrode of the seventh transistor is electrically connected to the first control node, a first electrode of the seventh transistor is electrically connected to the third control node, and a second electrode of the seventh transistor is electrically connected to the second voltage terminal; a gate electrode of the eighth transistor is electrically connected to the second control node, a first electrode of the eighth transistor is electrically connected to the fourth control node, and a second electrode of the eighth transistor is electrically connected to the second voltage terminal; the third output control circuit includes a ninth transistor and a tenth transistor; a gate electrode of the ninth transistor is electrically connected to the scanning output terminal, a first electrode of the ninth transistor is electrically connected to the first voltage terminal, and a second electrode of the ninth transistor is electrically connected to the output control terminal; a gate electrode of the tenth transistor is electrically connected to the scanning output terminal, a first electrode of the tenth transistor is electrically connected to the output control terminal, and a second electrode of the tenth transistor is electrically connected to the third control node; the fourth output control circuit includes an eleventh transistor and a twelfth transistor; a gate electrode of the eleventh transistor is electrically connected to the output control terminal, a first electrode of the eleventh transistor is electrically connected to the first voltage terminal, and a second electrode of the eleventh transistor is electrically connected to the scanning output terminal; a gate electrode of the twelfth transistor is electrically connected to the output control terminal, a first electrode of the twelfth transistor is electrically connected to the scanning output terminal, and a second electrode of the twelfth transistor is electrically connected to the fourth control node; the second output circuit includes a thirteenth transistor and a fourteenth transistor; a gate electrode of the thirteenth transistor is electrically connected to the scanning output terminal, a first electrode of the thirteenth transistor is electrically connected to the first voltage terminal, and a second electrode of the thirteenth transistor is electrically connected to the scanning signal output terminal; a gate electrode of the fourteenth transistor is electrically connected to the scanning output terminal, a first electrode of the fourteenth transistor is electrically connected to the scanning signal output terminal, and a second electrode of the fourteenth transistor is electrically connected to the second voltage terminal.

Optionally, the connection control circuit includes a fifteenth transistor, the fifth output control circuit includes a sixteenth transistor, and the sixth output control circuit includes a seventeenth transistor; a gate electrode of the fifteenth transistor is electrically connected to the third gating control line, a first electrode of the fifteenth transistor is electrically connected to the connection node, and a second electrode of the fifteenth transistor is electrically connected to the second voltage terminal; a gate electrode of the sixteenth transistor is electrically connected to the third gating control line, a first electrode of the sixteenth transistor is electrically connected to the first voltage terminal, and a second electrode of the sixteenth transistor is electrically connected to the output control terminal; a gate electrode of the seventeenth transistor is electrically connected to the third gating control line, a first electrode of the seventeenth transistor is electrically connected to the first voltage terminal, and a second electrode of the seventeenth transistor is electrically connected to the scanning output terminal.

In a second aspect, a driving method applied to the driving circuit, wherein the driving method includes: in at least part of a blank time period between two frames of display time; controlling, by the first switching circuit, to write the data signal provided by the at least two data output terminals of the source driver into the scanning signal generation circuit under the control of the first gating control signal; generating, by the scanning signal generation circuit, the scanning signal according to the data signal provided by the at least two data output terminals, and outputting the scanning signal to a corresponding column of scanning line of a display panel through the scanning signal output terminal.

Optionally, at least two data output terminals are electrically connected to different columns of data lines included in the display panel respectively; the driving method further includes: in a data writing-in time period in a frame of display time, providing, by the data output terminal, a data voltage to a data line that is electrically connected to the date output terminal.

Optionally, the driving circuit further includes a second switching circuit; the driving method further includes: in a data writing-in time period in a frame of display time, controlling, by the second switching circuit, to connect or disconnect the data output terminal of the source driver and the corresponding column of data line of the display panel under the control of the second gating control signal.

In a third aspect, a pixel circuit includes a light-emitting element, a light-emitting driving circuit and a control circuit; wherein the light-emitting driving circuit is electrically connected to a first node, a second node and a third node respectively, and is configured to generate a driving current flowing through the second node and the third node under the control of a potential of the first node; the light-emitting element is electrically connected to the third node; the control circuit is electrically connected to a first gate line, a scanning line, the first node and the third node respectively, and is configured to control to connect or disconnect the first node and the third node under the control of a first gate driving signal provided by the first gate line and a scanning signal provided by the scanning line.

Optionally, the control circuit includes a first control circuit and a second control circuit; the first control circuit is electrically connected to the first gate line, the first node and an intermediate node respectively, and a second terminal of the first control circuit is electrically connected to the intermediate node, the first control circuit is configured to control to connect or disconnect the first node and the intermediate node under the control of the first gate driving signal provided by the first gate line; the second control circuit is electrically connected to the scanning line, the intermediate node and the third node respectively, and is configured to control to connect or disconnect the intermediate node and the third node under the control of the scanning signal provided by the scanning line.

Optionally, the control circuit comprises a first control circuit and a second control circuit; the first control circuit is electrically connected to the first gate line, the third node and an intermediate node respectively, and is configured to control to connect or disconnect the third node and the intermediate node under the control of the first gate driving signal provided by the first gate line; the second control circuit is electrically connected to the scanning line, the intermediate node and the first node respectively, and is configured to control to connect or disconnect the intermediate node and the first node under the control of the scanning signal provided by the scanning line.

Optionally, the pixel circuit further includes a first initialization circuit; the first initialization circuit is electrically connected to a first initial control terminal, a first initial voltage terminal and the second node respectively, and is configured to write a first initial voltage provided by the first initial voltage terminal into the second node under the control of a first initial control signal provided by the first initial control terminal.

Optionally, the pixel circuit further includes a second initialization circuit; wherein the second initialization circuit is electrically connected to a second initial control terminal, a second initial voltage terminal and the third node respectively, and is configured to write a second initial voltage provided by the second initial voltage terminal into the third node under the control of a second initial control signal provided by the second initial control terminal.

Optionally, the pixel circuit further includes a data writing-in circuit, a first light-emitting control circuit, a second light-emitting control circuit and an energy storage circuit; wherein the data writing-in circuit is electrically connected to a second gate line, a data line and the second node respectively, and is configured to writing a data voltage provided by the data line into the second node under the control of a second gate driving signal provided by the second gate line; the first light-emitting control circuit is electrically connected to a light-emitting control line, a power supply voltage terminal and the second node respectively, and is configured to control to connect or disconnect the power supply voltage terminal and the second node under the control of a light-emitting control signal provided by the light-emitting control line; the second light-emitting control circuit is electrically connected to the light-emitting control line, the third node and a first electrode of the light-emitting element respectively, and is configured to control to connect the third node and the first electrode of the light-emitting element and connect a second electrode of the light-emitting element and a third voltage terminal under the control of the light-emitting control signal; the energy storage circuit is electrically connected to the first node and is configured to store electric energy.

Optionally, the pixel circuit further includes a third initialization circuit; the third initialization circuit is electrically connected to a first initial control terminal, a third initial voltage terminal and the first electrode of the light-emitting element respectively, and is configured to write a third initial voltage provided by the third initial voltage terminal into the first electrode of the light-emitting element under the control of the first initial control signal provided by the first initial control terminal.

Optionally, the first control circuit includes a first control transistor, and the second control circuit comprises a second control transistor; a gate electrode of the first control transistor is electrically connected to the first gate line, a first electrode of the first control transistor is electrically connected to the first node, and a second electrode of the first control transistor is electrically connected to the intermediate node; a gate electrode of the second control transistor is electrically connected to the scanning line, a first electrode of the second control transistor is electrically connected to the intermediate node, and a second electrode of the second control transistor is electrically connected to the third node.

Optionally, the first control circuit includes a first control transistor, and the second control circuit includes a second control transistor; a gate electrode of the first control transistor is electrically connected to the first gate line, a first electrode of the first control transistor is electrically connected to the intermediate node, and a second electrode of the first control transistor is electrically connected to the third node; a gate electrode of the second control transistor is electrically connected to the scanning line, a first electrode of the second control transistor is electrically connected to the first node, and a second electrode of the second control transistor is electrically connected to the intermediate node.

Optionally, the first initialization circuit includes a first initialization transistor; a gate electrode of the first initialization transistor is electrically connected to the first initial control terminal, a first electrode of the first initialization transistor is electrically connected to the first initial voltage terminal, and a second electrode of the first initialization transistor is electrically connected to the second node.

Optionally, the second initialization circuit includes a second initialization transistor; a gate electrode of the second initialization transistor is electrically connected to the second initial control terminal, a first electrode of the second initialization transistor is electrically connected to the second initial voltage terminal, and a second electrode of the second initialization transistor is electrically connected to the third node.

Optionally, the data writing-in circuit includes a writing-in transistor, the first light-emitting control circuit includes a first light-emitting control transistor, the second light-emitting control circuit includes a second light-emitting control transistor, the light-emitting driving circuit includes a driving transistor, and the energy storage circuit includes a storage capacitor; a gate electrode of the writing-in transistor is electrically connected to the second gate line, a first electrode of the writing-in transistor is electrically connected to the data line, and a second electrode of the writing-in transistor is electrically connected to the second node; a gate electrode of the first light-emitting control transistor is electrically connected to the light-emitting control line, a first electrode of the first light-emitting control transistor is electrically connected to the power supply voltage terminal, and a second electrode of the first light-emitting control transistor is electrically connected to the second node; a gate electrode of the second light-emitting control transistor is electrically connected to the light-emitting control line, a first electrode of the second light-emitting control transistor is electrically connected to the third node, and a second electrode of the second light-emitting control transistor is electrically connected to the first electrode of the light-emitting element; a gate electrode of the driving transistor is electrically connected to the first node, a first electrode of the driving transistor is electrically connected to the second node, and a second electrode of the driving transistor is electrically connected to the third node; a first terminal of the storage capacitor is electrically connected to the first node, and a second terminal of the storage capacitor is electrically connected to the power supply voltage terminal.

Optionally, the third initialization circuit comprises a third initialization transistor; a gate electrode of the third initialization transistor is electrically connected to the first initial control terminal, a first electrode of the third initialization transistor is electrically connected to the third initial voltage terminal, and a second electrode of the third initialization transistor is electrically connected to the first electrode of the light-emitting element.

In a fourth aspect, a pixel driving method applied to the pixel circuit, wherein the pixel driving method includes: generating, by the light-emitting driving circuit, the driving current flowing through the second node and the third node under the control of the potential of the first node; controlling, by the control circuit, to connect or disconnect the first node and the third node under the control of the first gate driving signal and the scanning signal.

Optionally, the pixel circuit includes a first initialization circuit, and a display period includes a first initial time period and a second initial time period successively set; the pixel driving method includes: in the first initialization time period, controlling, by the control circuit, to connect the first node and the third node under the control of the first gate driving signal and the scanning signal; writing, by the first initialization circuit, the first initial voltage into the second node under the control of the first initial control signal, controlling, by the light emitting driving circuit, to connect the second node and the third node under the control of the potential of the first node; in the second initialization time period, controlling, by the control circuit, to disconnect the first node from the third node under the control of the first gate driving signal and the scanning signal; writing, by the first initialization circuit, the first initial voltage into the second node under the control of the first initial control signal; and controlling, by the light-emitting driving circuit, to connect the second node and the third node under the control of the potential of the first node.

In a fifth aspect, a display panel includes a source driver and the driving circuit; the source driver comprises a plurality of data output terminals.

Optionally, the display panel includes a plurality of columns of scanning lines; the scanning signal output terminal of the scanning signal generation circuit in the driving circuit is electrically connected to the scanning line.

Optionally, the display panel comprises a plurality of columns of scanning lines and a plurality of columns of pixel circuits; a column of scanning line is electrically connected to two columns of pixel circuits.

Optionally, the display panel comprises a plurality of columns of data lines; the data output terminal is directly connected to the data line; or, the driving circuit comprises a second switching circuit, and the second switching circuit is configured to control to connect or disconnect the data output terminal and the data line under the control of the second gating control signal.

Optionally, the source driver is arranged on a first side of the display panel, and the driving circuit is arranged on the first side of the display panel; the source driver is arranged on the first side of the display panel, the driving circuit is arranged on a second side of the display panel, and the first side is opposite to the second side.

Optionally, the display panel further includes the pixel circuit.

In a sixth aspect, a display device includes the display panel.

DETAILED DESCRIPTION

Figure 1:
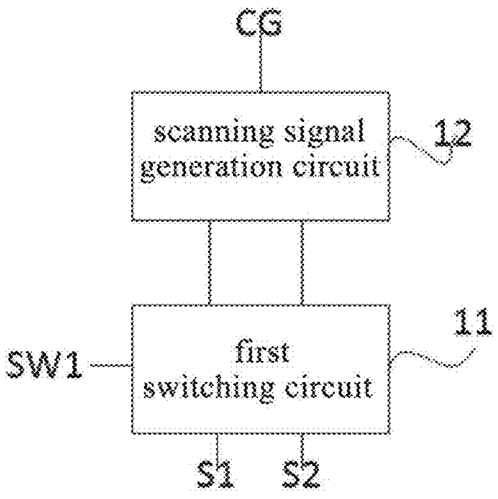
FIG. 1 is a structural diagram of the driving circuit according to at least one embodiment of the present disclosure.

The following will clearly and completely describe the technical solutions in the embodiments of the present disclosure with reference to the accompanying drawings. Obviously, the embodiments are only some of the embodiments of the present disclosure, not all of them. Based on the embodiments in the present disclosure, all other embodiments obtained by those ordinary skill in the art without making creative work belong to the protection scope of the present disclosure.

The transistors used in all the embodiments of the present disclosure may be thin film transistors or field effect transistors or other devices with the same characteristics. In the embodiments of the present disclosure, in order to distinguish the two electrodes of the transistor except the control electrode, one electrode is called the first electrode, and the other electrode is called the second electrode.

In actual operation, when the transistor is a thin film transistor or a field effect transistor, the control electrode may be a gate electrode, the first electrode may be a drain electrode, and the second electrode may be a source electrode; or, the control electrode may be a gate electrode, the first electrode may be a source electrode, and the second electrode may be a drain electrode.

The driving circuit according to the embodiment of the present disclosure includes a first switching circuit and a scanning signal generation circuit;

the first switching circuit is electrically connected to a first gating control line, at least two data output terminals of a source driver and the scanning signal generation circuit, and is configured to write a data signal provided by the at least two data output terminals into the scanning signal generation circuit under the control of a first gating control signal provided by the first gating control line;

The scanning signal generation circuit is configured to generate a scanning signal according to the data signal, and output the scanning signal through the scanning signal output terminal.

In the embodiment of the present disclosure, the driving circuit may include a first switching circuit and a scanning signal generation circuit, at least part of the blank time period between the two frames of display times, the first switching circuit is controlled to write the data signal provided by at least two data output terminals to the scanning signal generation circuit under the control of the first gating control signal, the scanning signal generation circuit generates a scanning signal according to the data signal, and the scanning signal is provided to a column of scanning line included in the display panel, so that the transistor controlled by the column of scanning line is controlled to be turned on or off in the next frame of display time according to the scanning signal.

In the specific embodiment, when the transistor controlled by the column of scanning line is turned off in the next frame of display time, the pixel circuit where the transistor is located does not write the data voltage, and the original display brightness can be maintained through the transistor with low leakage, so as to avoid the waste of a part of the power consumption caused by repeated flashing of the pixel circuit;

When the transistor controlled by the column of scanning line is turned on in the next frame of display time, the pixel circuit where the transistor is located writes the data voltage and refreshes the image normally.

In order to update the screen of the organic light-emitting diode (OLED) display, it is necessary to initialize all the pixel circuits and write the data voltage in one frame of display time. However, under some special images, such as all-weather screen-off display (AOD) image, static image or less updated image, the data voltage of most of the pixel circuits on the whole screen does not need to be updated, and the original display brightness can be maintained through the low-temperature polycrystalline oxide (LTPO) thin film transistor (TFT) with low leakage, which causes a waste of data line power consumption due to repeated flashing of these pixel circuits.

Based on this, the embodiment of the present disclosure designs a driving circuit to control a scanning signal on a column of scanning line for at least part of the blank time period between two frame of display times, so that according to the scanning signal, in the next frame of the display time, the transistor controlled by the scanning line is turned on or off to control whether the corresponding pixel circuit is refreshed with data voltage, so that the partial image of the screen is updated, and the rest of the image does not need to be charged and discharged multiple times, so as to further reduce the power consumption of the OLED display, or realize ultra-low power consumption through the partial update of the display image.

As shown in FIG. 1, the driving circuit according to at least one embodiment of the present disclosure includes a first switching circuit 11 and a scanning signal generation circuit SD;

the first switching circuit 11 is electrically connected to the first gating control line SW1, the first data output terminal S1 of the source driver, the second data output terminal S2 of the source driver and the scanning signal generation circuit SD, and is configured to write the data signal provided by the first data output terminal S1 and the data signal provided by the second data output terminal S2 into the scanning signal generation circuit SD under the control of the first gating control signal provided by the first gating control line SW1;

the scanning signal generation circuit SD is configured to generate the scanning signal according to the data signal, and outputs the scanning signal through scanning signal output terminal CG.

In at least one embodiment of the present disclosure, the at least two data output terminals are electrically connected to different columns of data lines included in the display panel respectively;

The scanning signal output terminal of the scanning signal generation circuit is electrically connected to a column of scanning line included in the display panel.

In the specific embodiment, the data output terminal can be directly connected to a column of data line, and the scanning signal output terminal can be electrically connected to a column of scanning line.

In at least one embodiment of the present disclosure, the display panel may include a plurality of rows and a plurality of columns of pixel circuits, a plurality of rows of first gate lines, a plurality of column of data lines and a plurality of columns of scanning lines, a column of pixel circuit and a column of data line;

The column of scanning line may be arranged between the adjacent two columns of pixel circuits, and electrically connected to the adjacent two columns of pixel circuits, that is, the two columns of pixel circuits can share a column of scanning lines.

Optionally, at least two data output terminals are electrically connected to different data lines included in the display panel respectively;

The scanning signal output terminal of the scanning signal generation circuit is electrically connected to two columns of scanning lines included in the display panel respectively.

In at least one embodiment of the present disclosure, the scanning signal output terminal may be electrically connected to two rows of scanning lines respectively, and the scanning signals provided by the scanning signal output terminal are respectively written into the two columns of scanning lines, and the two columns of scanning lines may be electrically connected to the two columns of pixel circuits respectively, but are not limited to this.

Figure 2:
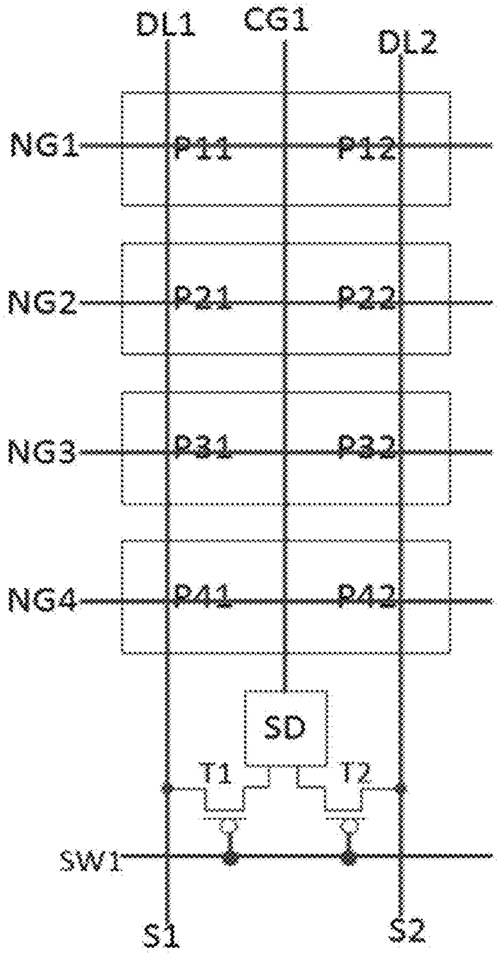
FIG. 2 is a circuit diagram of the driving circuit according to at least one embodiment of the present disclosure.

As shown in FIG. 2, the first row and the first column of pixel circuit is labeled P11, the first row and the second column of pixel circuit is labeled P12, the second row and the first column of pixel circuit is labeled P21, the second row and the second column of pixel circuit is labeled P22, the third row and the first column of pixel circuit is labeled P31, the third row and the second column of pixel circuit is labeled P32, the fourth row and the first column of pixel circuit is labeled P41, the fourth row and the second column of pixel circuit is labeled P42;

the first column of data line is labeled DL1, the second column of data line is labeled DL2, the first column of scanning line is labeled CG1, the first row of first gate line is labeled NG1, the second row of first gate line is labeled NG2, the third row of first gate line is labeled NG3, and the fourth row of first gate line is labeled NG4;

the driving circuit of at least one embodiment of the present disclosure includes a first switching circuit and a scanning signal generation circuit SD;

the first switching circuit may include a first transistor T1 and a second transistor T2;

the gate electrode of T1 is electrically connected to the first gating control line SW1, the source electrode of T1 is electrically connected to the first column of data line DL1, and the drain electrode of T1 is electrically connected to the scanning signal generation circuit SD;

the gate electrode of T2 is electrically connected to the first gating control line SW1, the source electrode of T1 is electrically connected to the second column of data line DL2, and the drain electrode of T2 is electrically connected to the scanning signal generation circuit SD;

DL1 is electrically connected to the first data output terminal S1 of the source driver, and DL2 is electrically connected to the second data output terminal S2 of the source driver;

The scanning signal generation circuit SD is configured to generate a scanning signal according to the data signal provided by the first data output terminal S1 and the data signal provided by the second data output terminal S2, and the scanning signal is provided to the first column of scanning line CG1.

In at least one embodiment shown in FIGS. 2, T1 and T2 are p-type transistors, and between the two frames of display time, SW1 provides a low voltage signal to turn on T1 and T2.

Figure 3:
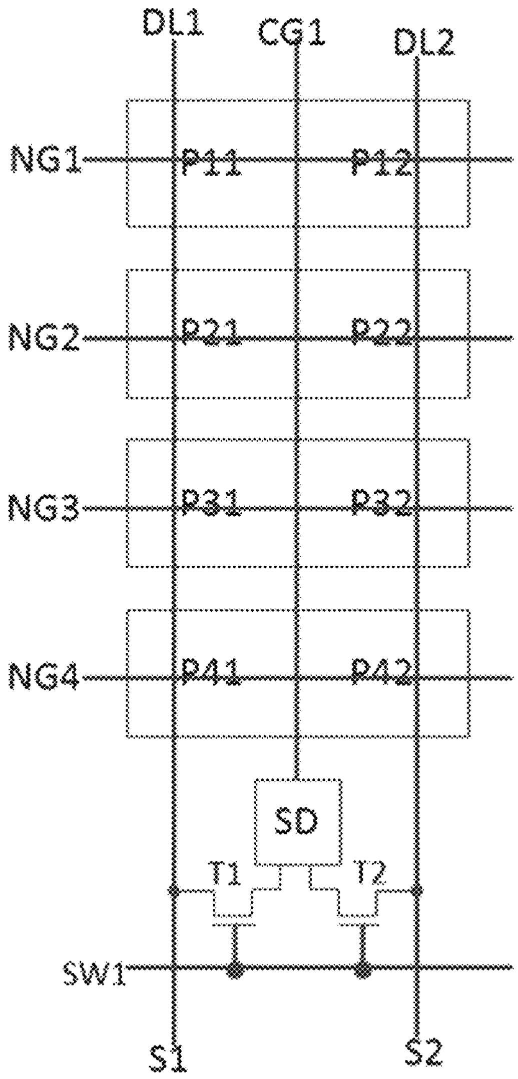
FIG. 3 is a circuit diagram of the driving circuit according to at least one embodiment of the present disclosure.

The difference between at least one of the embodiments shown in FIG. 3 and at least one of the embodiments shown in FIG. 2 is that T1 and T2 are n-type transistors, and between the two frames of display time, SW1 provides a high voltage signal to turn on T1 and T2.

Optionally, the driving circuit further comprises a second switching circuit;

the second switching circuit is electrically connected to the second gating control line, at least two data output terminals of the source driver and at least two data lines included in the display panel respectively, and is configured to control to connect or disconnect at least two data output terminals of the source driver and a column of data line included in the display panel respectively under the control of the second gating control signal provided by the second gating control line;

The first gating control line is the same gating control line as the second gating control line, or the first gating control line is different from the second gating control line.

In the specific embodiment, the driving circuit may also include a second switching circuit, and the second switching circuit controls to connect or disconnect least two data output terminals and a column of data line respectively under the control of the second gating control signal.

Figure 4:
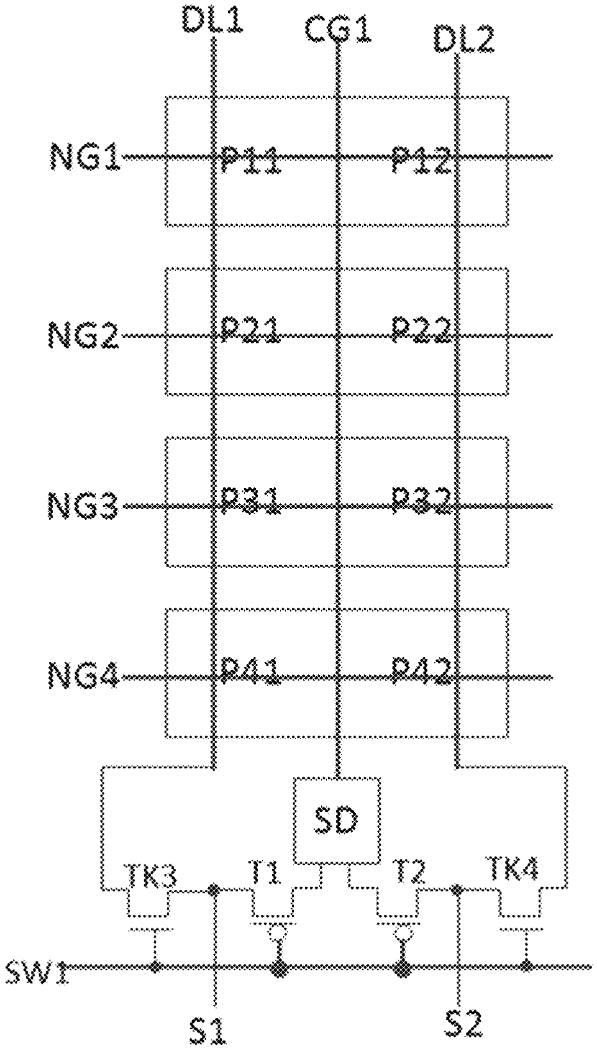
FIG. 4 is a circuit diagram of the driving circuit according to at least one embodiment of the present disclosure.

As shown in FIG. 4, the first row and the first column of pixel circuit is labeled P11, the first row and the second column of pixel circuit is labeled P12, the second row and the first column of pixel circuit is labeled P21, the second row and the second column of pixel circuit is labeled P22, the third row and the first column of pixel circuit is labeled P31, the third row and the second column of pixel circuit is labeled P32, the fourth row and the first column of pixel circuit is labeled P41, the fourth row and the second column of pixel circuit is labeled P42 the first column of data line is labeled DL1, the second column of data line is labeled DL2, the first column of scanning line is labeled CG1, the first row of first gate line is labeled NG1, the second row of first gate line is labeled NG2, the third row of first gate line is labeled NG1, and the fourth row of first gate line is labeled NG4;

The driving circuit according to at least one embodiment of the present disclosure includes a first switching circuit, a second switching circuit and a scanning signal generation circuit SD;

the first switching circuit may include a first transistor T1 and a second transistor T2;

the gate electrode of T1 is electrically connected to the first gating control line SW1, the source electrode of T1 is electrically connected to the first column of data line DL1, and the drain electrode of T1 is electrically connected to the scanning signal generation circuit SD;

the gate electrode of T2 is electrically connected to the first gating control line SW1, the source electrode of T1 is electrically connected to the second column of data line DL2, and the drain electrode of T2 is electrically connected to the scanning signal generation circuit SD;

the second switching circuit 13 comprises a third switching transistor TK3 and a fourth switching transistor TK4;

The gate electrode of TK3 is electrically connected to the first gating control line SW1, the source electrode of TK3 is electrically connected to the first column of data line DL1, and the drain electrode of TK3 is electrically connected to the first data output terminal S1 of the source driver;

The gate electrode of TK4 is electrically connected to the first gating control line SW1, the source electrode of TK4 is electrically connected to the second column of data line DL2, and the drain electrode of TK4 is electrically connected to the first data output terminal S1 of the source driver;

The scanning signal generation circuit SD is configured to generate a scanning signal according to the data signal provided by the first data output terminal S1 and the data signal provided by the second data output terminal S2, and the scanning signal is provided to the first column of scanning line CG1.

In at least one embodiment shown in FIGS. 4, T1 and T2 are p-type transistors, and TK3 and TK4 are n-type transistors.

When at least one embodiment of the present disclosure is operating, at least part of the blank time period between the two frames of display time, SW1 provides a low voltage signal, T1 and T2 are turned on, so that the data signal provided by the first data output terminal S1 and the data signal provided by the second data output terminal S2 are written into the scanning signal generation circuit SD, the scanning signal generation circuit SD is configured to generate a scanning signal according to the data signal provided by the first data output terminal S1 and the data signal provided by the second data output terminal S2, and the scanning signal is provided to the first column of scanning line CG1;

In a frame of display time, SW1 provides a high voltage signal, and TK3 and TK4 are turned on to control to connect the first data output terminal S1 and the first column of data line DL1, and control to connect the second data output terminal S2 and the second column of data line DL2.

Figure 5:
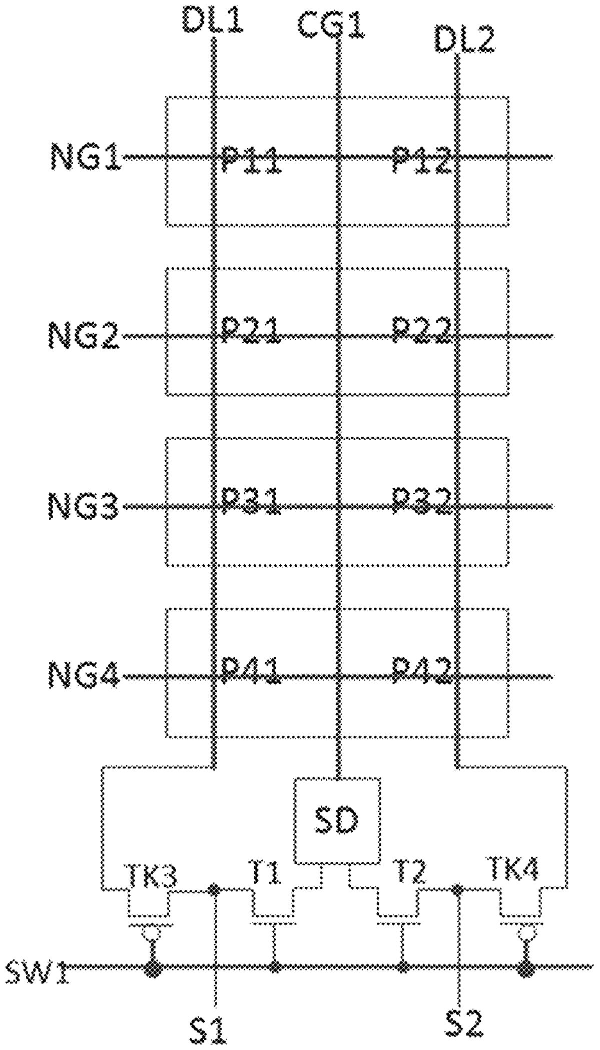
FIG. 5 is a circuit diagram of the driving circuit according to at least one embodiment of the present disclosure.

The difference between at least one embodiment shown in FIG. 5 and at least one embodiment shown in FIG. 4 is that T1 and T2 are n-type transistors, and TK3 and TK4 are p-type transistors.

At least one embodiment of the present disclosure as shown in FIG. 5 is operating, at least part of the blank time period between the two frames of display time, SW1 provides a high voltage signal, T1 and T2 are turned on, so that the data signal provided by the first data output terminal S1 and the data signal provided by the second data output terminal S2 are written into the scanning signal generation circuit SD, and the scanning signal generation circuit SD is configured to generate a scanning signal according to the data signal provided by the first data output terminal S1 and the data signal provided by the second data output terminal S2, and the scanning signal is provided to the first column of scanning line CG1;

In a frame of display time, SW1 provides a low voltage signal, and TK3 and TK4 are turned on to control to connect the first data output terminal S1 and the first column of data line DL1, and control to connect the second data output terminal S2 and the second column of data line DL2.

In at least one embodiment shown in FIG. 4 and FIG. 5, the first gating control line and the second gating control line are the same gating control line.

Figure 6A:
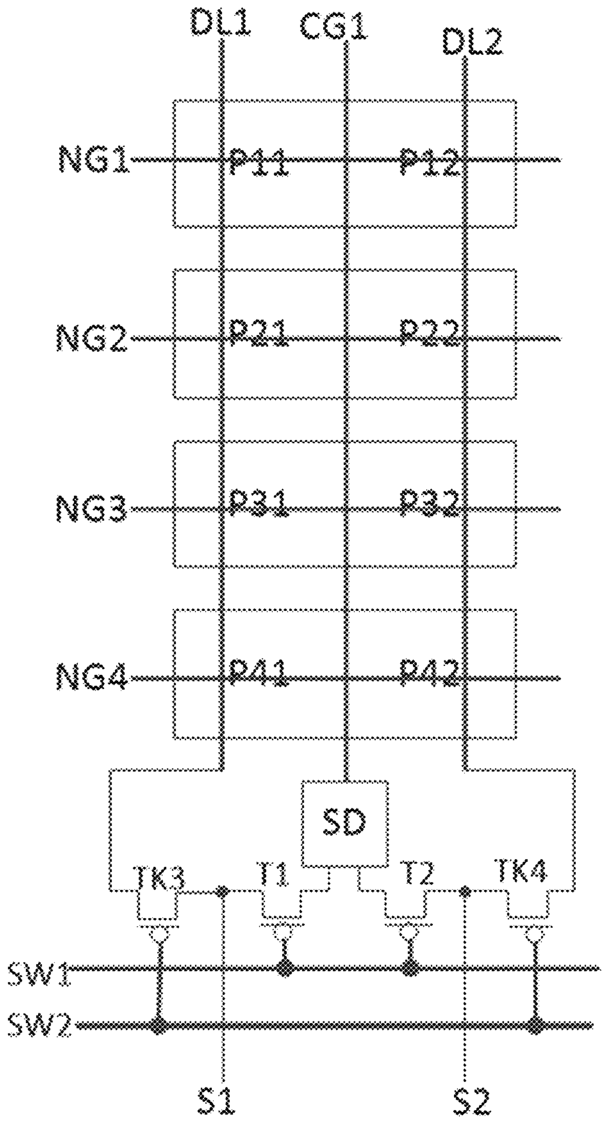
FIG. 6A is a circuit diagram of the driving circuit according to at least one embodiment of the present disclosure.

As shown in FIG. 6A, the first row and the first column of pixel circuit is labeled P11, the first row and the second column of pixel circuit is labeled P12, the second row and the first column of pixel circuit is labeled P21, the second row and the second column of pixel circuit is labeled P22, the third row and the first column of pixel circuit is labeled P31, the third row and the second column of pixel circuit is labeled P32, the fourth row and the first column of pixel circuit is labeled P41, the fourth row and the second column of pixel circuit is labeled P42 the first column of data line is labeled DL1, the second column of data line is labeled DL2, the first column of scanning line is labeled CG1, the first row of first gate line is labeled NG1, the second row of first gate line is labeled NG2, the third row of first gate line is labeled NG3, and the fourth row of first gate line is labeled NG4;

The driving circuit according to at least one embodiment of the present disclosure includes a first switching circuit, a second switching circuit and a scanning signal generation circuit SD;

the first switching circuit may comprise a first transistor T1 and a second transistor T2;

the gate electrode of T1 is electrically connected to the first gating control line SW1, the source electrode of T1 is electrically connected to the first column of data line DL1, and the drain electrode of T1 is electrically connected to the scanning signal generation circuit SD;

the gate electrode of T2 is electrically connected to the first gating control line SW1, the source electrode of T1 is electrically connected to the second column of data line DL2, and the drain electrode of T2 is electrically connected to the scanning signal generation circuit SD;

the second switching circuit 13 comprises a third switching transistor TK3 and a fourth switching transistor TK4;

The gate electrode of TK3 is electrically connected to the second gating control line SW2, the source electrode of TK3 is electrically connected to the first column of data line DL1, and the drain electrode of TK3 is electrically connected to the first data output terminal S1 of the source driver;

The gate electrode of TK4 is electrically connected to the second gating control line SW2, the source electrode of TK4 is electrically connected to the second column of data line DL2, and the drain electrode of TK4 is electrically connected to the first data output terminal S1 of the source driver;

The scanning signal generation circuit SD is configured to generate a scanning signal according to the data signal provided by the first data output terminal S1 and the data signal provided by the second data output terminal S2, and the scanning signal is provided to the first column of scanning line CG1.

In at least one embodiment shown in FIG. 6A, the first gating control line and the second gating control line are different gating control lines.

In at least one embodiment shown in FIG. 6A, T1 and T2 are p-type transistors, and TK3 and TK4 are p-type transistors.

At least one embodiment of the present disclosure as shown in FIG. 6A is operating, at least part of the blank time period between the two frames of display time, SW1 provides a low voltage signal, SW2 provides a high voltage signal, T1 and T2 are turned on, so that the data signal provided by the first data output terminal S1 and the data signal provided by the second data output terminal S2 are written into the scanning signal generation circuit SD, the scanning signal generation circuit SD is configured to generate a scanning signal according to the data signal provided by the first data output terminal S1 and the data signal provided by the second data output terminal S2, and the scanning signal is provided to the first column of scanning line CG1;

In a frame of display time, SW2 provides a low voltage signal, SW1 provides a high voltage signal, and TK3 and TK4 are turned on to control to connect the first data output terminal S1 and the first column of data line DL1, and control to connect the second data output terminal S2 and the second column of data line DL2.

In at least one embodiment of the present disclosure, the first switching circuit is respectively electrically connected to a first gating control line, a (2m−1)th data output terminal of the source driver, a 2mth data output terminal of the source driver, the first control node and the second control node, is configured to control to connect or disconnect the (2m−1)th data output terminal and the first control node under the control of the first gating control signal provided by the first gating control line, and control to connect or disconnect the 2mth data output terminal and the second control node.

Figure 6B:
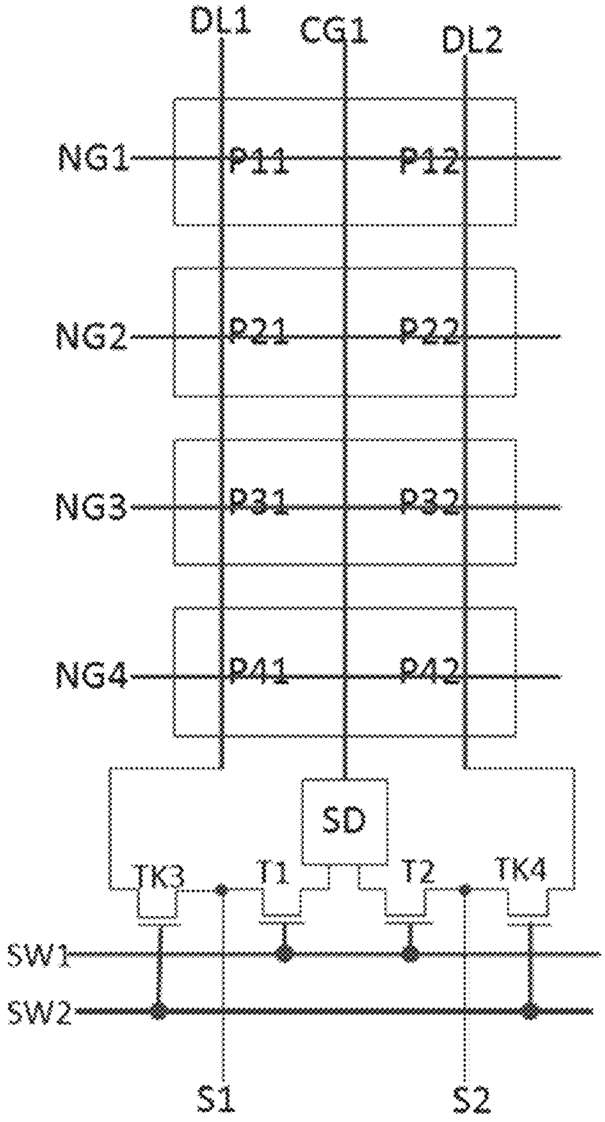
FIG. 6B is a circuit diagram of the driving circuit according to at least one embodiment of the present disclosure.

The difference between at least one embodiment shown in FIG. 6B and at least one embodiment shown in FIG. 6A is that T1 and T2 are n-type transistors, and TK3 and TK4 are n-type transistors.

At least one embodiment shown in FIG. 6B is in operation, at least part of the blank time period between the two frames of display time, SW1 provides a high voltage signal, SW2 provides a low voltage signal, and T1 and T2 are turned on to write the data signal provided by the first data output terminal S1 and the data signal provided by the second data output terminal S2 into the scanning signal generation circuit SD, the scanning signal generation circuit SD is configured to generate a scanning signal according to the data signal provided by the first data output terminal S1 and the data signal provided by the second data output terminal S2, and the scanning signal is provided to the first column of scanning line CG1;

In a frame of display time, SW2 provides a high voltage signal, SW1 provides a low voltage signal, and TK3 and TK4 are turned on to control to connect the first data output terminal S1 and the first column of data line DL1, and control to connect the second data output terminal S2 and the second column of data line DL2.

In at least one embodiment of the present disclosure, the first switching circuit is respectively connected to a first gating control line, a (2m−1)th data output terminal of the source driver, a 2mth data output terminal of the source driver, the first control node and the second control node, is configured to control to connect or disconnect the (2m−1)th data output terminal and the first control node under the control of the first gating control signal provided by the first gating control line, and control to connect or disconnect the 2mth data output terminal and the second control node.

In the specific embodiment, the first switching circuit can control to connect or disconnect the (2m−1)th data output terminal and the first control node under the control of the first gating control signal, and control to connect or disconnect the 2mth data output terminal and the second control node.

Optionally, the first switching circuit includes a first transistor, a second transistor, a first capacitor and a second capacitor;

a gate electrode of the first transistor is electrically connected to the first gating control line, a first electrode of the first transistor is electrically connected to the (2m−1)th data output terminal, and a second electrode of the first transistor is electrically connected to the first control node;

a gate electrode of the second transistor is electrically connected to the first gating control line, a first electrode of the second transistor is electrically connected to the 2mth data output terminal, and a second electrode of the second transistor is electrically connected to the second control node;

a first terminal of the first capacitor is electrically connected to the first control node, and a second terminal of the first capacitor is electrically connected to the control voltage terminal;

a first terminal of the second capacitor is electrically connected to the second control node, and a second terminal of the second capacitor is electrically connected to the control voltage terminal.

In at least one embodiment of the present disclosure, the control voltage terminal may be a DC voltage terminal, for example, the control voltage terminal may be a first voltage terminal or a second voltage terminal, but is not limited thereto.

In at least one embodiment shown in FIGS. 2 to 6B, the scanning signal generation circuit and the source driver are arranged on a same side of the display panel. In actual operation, the scanning signal generation circuit and the source driver can be arranged on an opposite side of the display panel.

Figure 7:
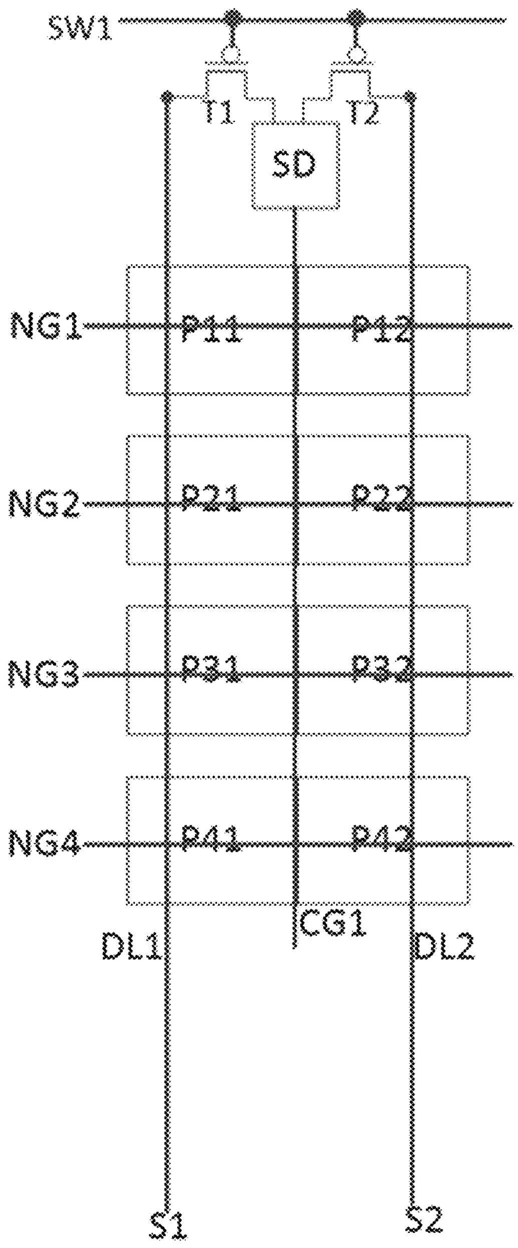
FIG. 7 is a circuit diagram of the driving circuit according to at least one embodiment of the present disclosure.

The difference between at least one embodiment shown in FIG. 7 and at least one embodiment shown in FIG. 2 is that T1, T2 and the scanning signal generation circuit are arranged on the upper side of the display panel.

Figure 8:
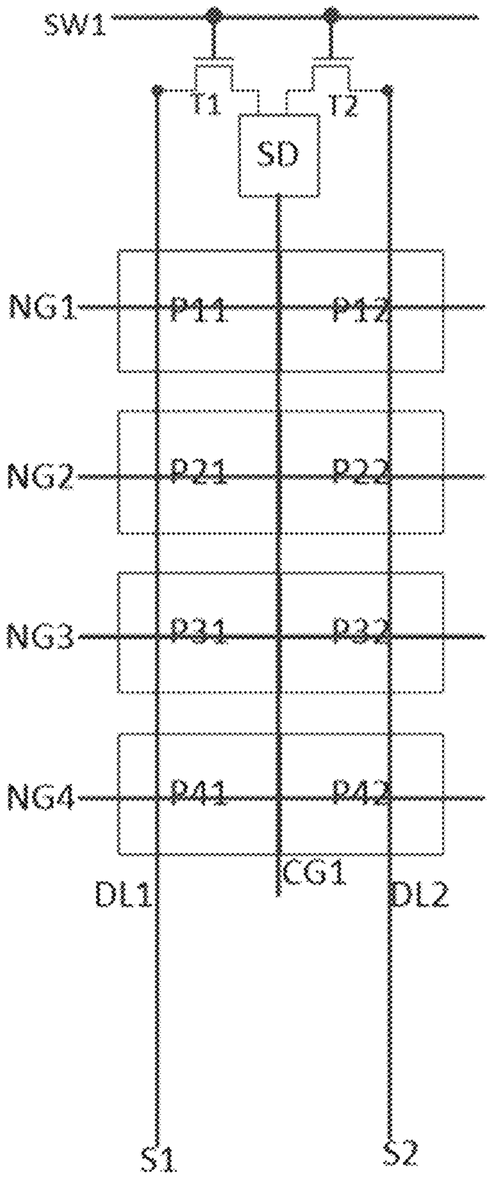
FIG. 8 is a circuit diagram of the driving circuit according to at least one embodiment of the present disclosure.

The difference between at least one embodiment shown in FIG. 8 and at least one embodiment shown in FIG. 3 is that T1, T2 and a scanning signal generation circuit are arranged on the upper side of the display panel.

In at least one embodiment shown in FIG. 2-FIG. 8, the scanning signal generation circuit SD may also be replaced with two columns of scanning lines, the scanning signals are provided to the two columns of scanning lines respectively, one column of scanning line in the two columns of scanning lines can be electrically connected to the first column of pixel circuits, and the other column of scanning line in the two columns of scanning lines can be electrically connected to the second column of pixel circuits.

In at least one embodiment of the present disclosure, the scanning signal generation circuit includes an output control circuit and a first output circuit;

the output control circuit is electrically connected to the first control node, the first voltage terminal, the second voltage terminal, the output control terminal and the scanning output terminal respectively, is configured to control to connect or disconnect the output control terminal and the first voltage terminal under the control of the potential of the first control node, and control to connect or disconnect the output control terminal and the second voltage terminal under the control of the signal provided by the scanning output terminal;

the first output circuit is electrically connected to the second control node, the output control terminal, the scanning output terminal, the first voltage terminal and the second voltage terminal respectively, and is configured to control to connect or disconnect the scanning output terminal and the first voltage terminal under the control of the potential of the second control node, and control to connect or disconnect the scanning output terminal and the second voltage terminal under the control of the potential of the output control terminal.

In the specific embodiment, the scanning signal generation circuit may include an output control circuit and a first output circuit, the output control circuit controls to connect or disconnect the output control terminal and the first voltage terminal under the control of the potential of the first control node, control to connect or disconnect the output control terminal and the second voltage terminal under the control of the signal provided by the scanning output terminal; the first output circuit controls to connect or disconnect the scanning output terminal and the first voltage terminal under the control of the potential of the second control node, and control to connect or disconnect the scanning output terminal and the second voltage terminal under the control of the potential of the output control terminal.

Optionally, the scanning output terminal is the scanning signal output terminal;

The scanning signal generation circuit further includes an inverting circuit; an input terminal of the inverting circuit is electrically connected to the scanning output terminal, an output terminal of the inverting circuit is electrically connected to the scanning signal output terminal, and the inverting circuit is configured to perform phase inversion on the voltage signal that is connected to its input terminal, obtains an inverted voltage signal, and outputs the inverted voltage signal through an output terminal of the inverting circuit.

Figure 9:
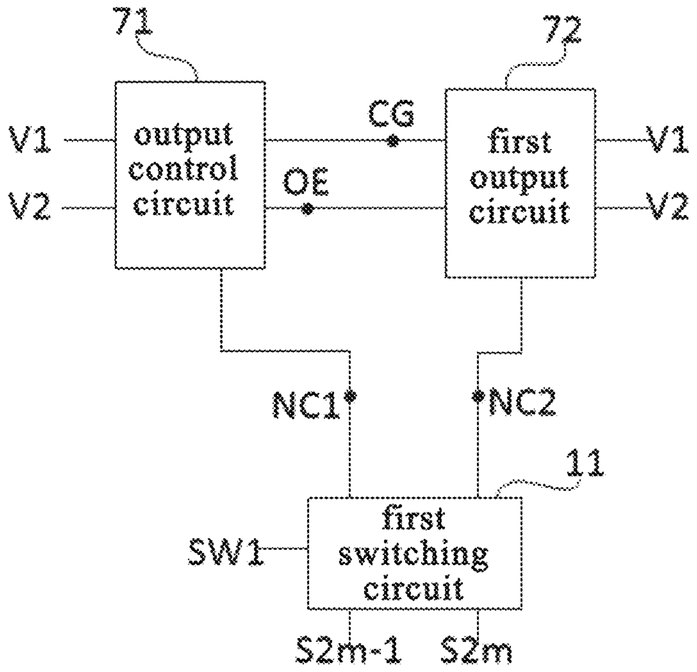
FIG. 9 is a structural diagram of the driving circuit according to at least one embodiment of the present disclosure.

As shown in FIG. 9, the first switching circuit 11 is respectively electrically connected to the first gating control line SW1, the (2m−1)th data output terminal S2*m*−1 of the source driver, the 2mth data output terminal S2*m* of the source driver, the first control node NC1 and the second control node NC2, is configured to control to connect or disconnect the (2m−1)th data output terminal S2*m*−1 and the first control node NC1 under the control of the first gating control signal provided by the first gating control line SW1, and control to connect or disconnect the 2mth data output terminal S2*m* and the second control node NC2;

The scanning signal generation circuit includes the output control circuit 71 and the first output circuit 72;

the output control circuit 71 is electrically connected to the first control node NC1, the first voltage terminal V1, the second voltage terminal V2, the output control terminal OE and the scanning signal output terminal CG respectively, is configured to control to connect or disconnect the output control terminal OE and the first voltage terminal V1 under the control of the potential of the first control node NC1, and control to connect or disconnect the output control terminal OE and the second voltage terminal V2 under the control of the signal provided by the scanning signal output terminal CG;

The first output circuit 72 is respectively electrically connected to the second control node NC2, the output control terminal OE, the scanning signal output terminal CG, the first voltage terminal V1 and the second voltage terminal V2, is configured to control to connect or disconnect the scanning signal output CG and the first voltage terminal V1 under the control of the potential of the second control node NC2, and control to connect or disconnect the scanning signal output CG and the second voltage terminal V2 under the control of the potential of the output control terminal OE.

In at least one embodiment of the scanning signal generation circuit shown in FIG. 9, the scanning output terminal may be the scanning signal output terminal CG, the first voltage terminal may be a high voltage terminal, and the second voltage terminal may be a low voltage terminal, but is not limited to this.

Figure 10:
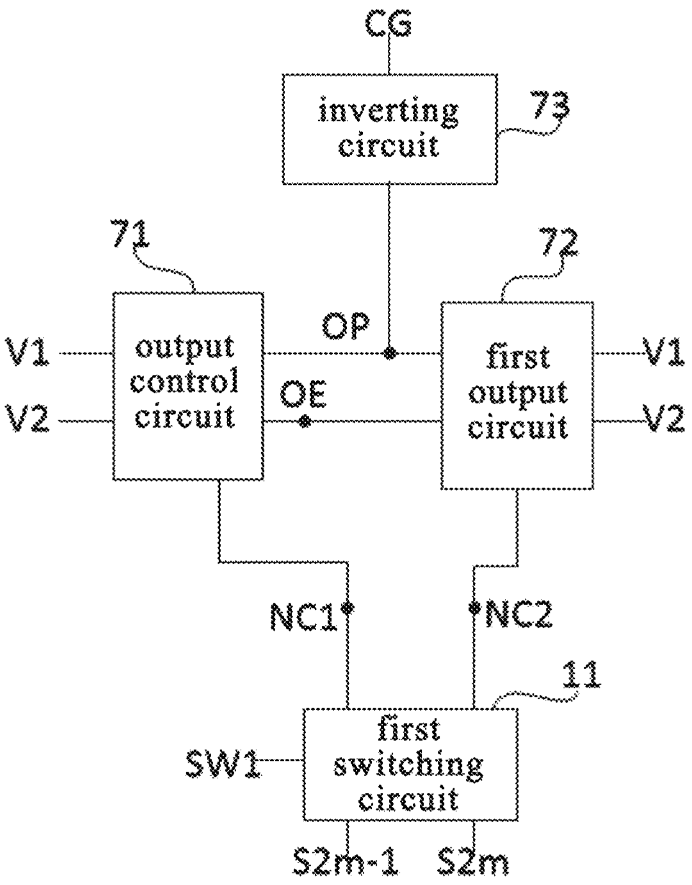
FIG. 10 is a structural diagram of the driving circuit according to at least one embodiment of the present disclosure.

As shown in FIG. 10, the first switching circuit 11 is respectively connected to the first gating control line SW1, the (2m−1)th data output terminal S2*m*−1 of the source driver, the 2mth data output terminal S2*m* of the source driver, the first control node NC1 and the second control node NC2, is configured to control to connect or disconnect the (2m−1)th data output terminal S2*m*−1 and the first control node NC1 under the control of the first gating control signal provided by the first gating control line SW1, and control to connect or disconnect the 2mth data output terminal S2*m* and the second control node NC2;

The scanning signal generation circuit includes the output control circuit 71 and the first output circuit 72;

- the output control circuit 71 is electrically connected to the first control node NC1, the first voltage terminal V1, the second voltage terminal V2, the output control terminal OE and the scanning output terminal OP respectively, is configured to control to connect or disconnect the output control terminal OE and the first voltage terminal V1 under the control of the potential of the first control node NC1, and control to connect or disconnect the output control terminal OE and the second voltage terminal V2 under the control of the signal provided by the scanning output terminal OP;
- the first output circuit 72 is electrically connected to the second control node NC2, the scanning output terminal OP, the output control terminal OE, the first voltage terminal V1 and the second voltage terminal V2 respectively, is configured to control to connect or disconnect the scanning output terminal OP and the first voltage terminal V1 under the control of the potential of the second control node NC2, and control to connect or disconnect the scanning output terminal OP and the second voltage terminal V2 under the control of the potential of the output control terminal OE;
- the scanning signal generation circuit further includes an inverting circuit 73;

The input terminal of the inverting circuit 73 is electrically connected to the scanning output terminal OP, the output terminal of the inverting circuit 73 is electrically connected to the scanning signal output terminal CG, the inverting circuit 73 is configured to perform phase inversion on the voltage signal that is connected to its input terminal, obtains an inverted voltage signal, and outputs the inverted voltage signal through the output terminal of the inverting circuit 73.

Optionally, the output control circuit includes a third transistor and a fourth transistor;

- a gate electrode of the third transistor is electrically connected to the first control node, a first electrode of the third transistor is electrically connected to the first voltage terminal, and a second electrode of the third transistor is electrically connected to the output control terminal;
- a gate electrode of the fourth transistor is electrically connected to the scanning output terminal, a first electrode of the fourth transistor is electrically connected to the output control terminal, and a second electrode of the fourth transistor is electrically connected to the second voltage terminal;
- the output circuit includes a fifth transistor and a sixth transistor;
- a gate electrode of the fifth transistor is electrically connected to the second control node, a first electrode of the fifth transistor is electrically connected to the first voltage terminal, and a second electrode of the fifth transistor is electrically connected to the scanning output terminal;
- a gate electrode of the sixth transistor is electrically connected to the output control terminal, a first electrode of the sixth transistor is electrically connected to the scanning output terminal, and a second electrode of the sixth transistor is electrically connected to the second voltage terminal.

Figure 11:
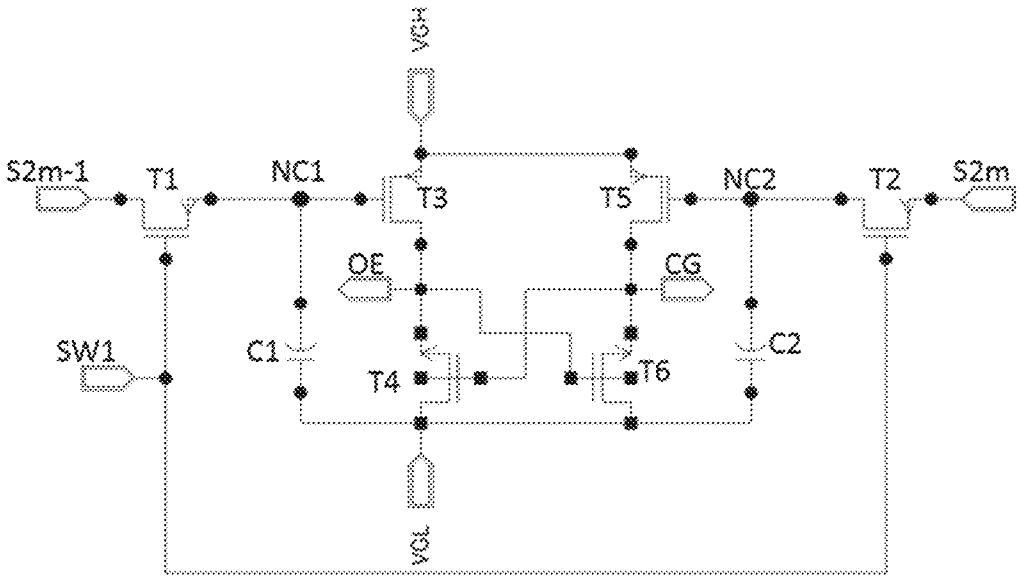
FIG. 11 is a circuit diagram of the driving circuit according to at least one embodiment of the present disclosure.

As shown in FIG. 11, on the basis of at least one embodiment shown in FIG. 9,

- the first switching circuit includes a first transistor T1, a second transistor T2, a first capacitor C1 and a second capacitor C2;
- the gate electrode of the first transistor T1 is electrically connected to the first gating control line SW1, the source electrode of the first transistor is electrically connected to the (2m−1)th data output terminal S2*m*−1, and the drain electrode of the first transistor T1 is electrically connected to the first control node NC1;
- the gate electrode of the second transistor T2 is electrically connected to the first gating control line, the source electrode of the second transistor T2 is electrically connected to the 2mth data output terminal S2*m*, and the drain electrode of the second transistor T2 is electrically connected to the second control node NC2;
- the first terminal of the first capacitor C1 is electrically connected to the first control node NC1, and the second terminal of the first capacitor C1 is electrically connected to the low voltage terminal VGL;
- the first terminal of the second capacitor C2 is electrically connected to the second control node NC2, and the second terminal of the second capacitor C2 is electrically connected to the low voltage terminal VGL;
- the output control circuit includes a third transistor T3 and a fourth transistor T4;
- the gate electrode of the third transistor T3 is electrically connected to the first control node NC1, the source electrode of the third transistor T3 is electrically connected to the high voltage terminal VGH, and the drain electrode of the third transistor T3 is electrically connected to the output control terminal OE;
- the gate electrode of the fourth transistor T4 is electrically connected to the scanning signal output terminal CG, the source electrode of the fourth transistor T4 is electrically connected to the output control terminal OE, and the drain electrode of the fourth transistor T4 is electrically connected to the low voltage terminal VGL;
- the output circuit includes a fifth transistor T5 and a sixth transistor T6;
- the gate electrode of the fifth transistor T5 is electrically connected to the second control node NC2, the source electrode of the fifth transistor T5 is electrically connected to the high voltage terminal VGH, and the drain electrode of the fifth transistor T5 is electrically connected to the scanning signal output terminal CG;

the gate electrode of the sixth transistor T6 is electrically connected to the output control terminal OE, the source electrode of the sixth transistor T6 is electrically connected to the scanning signal output terminal CG, and the drain electrode of the sixth transistor T6 is electrically connected to the low voltage terminal VGL.

In at least one embodiment of the scanning signal generation circuit shown in FIG. 11, the control voltage terminal is a second voltage terminal, the first voltage terminal is a high voltage terminal, and the second voltage terminal is a low voltage terminal, but is not limited thereto.

In at least one embodiment of the scanning signal generation circuit shown in FIG. 11, S2*m*−1 can be electrically connected to the (2m−1)th column of data line DL2*m*−1, and S2*m* can be electrically connected to the (2m−1)th column of data line DL2*m*.

Figure 12:
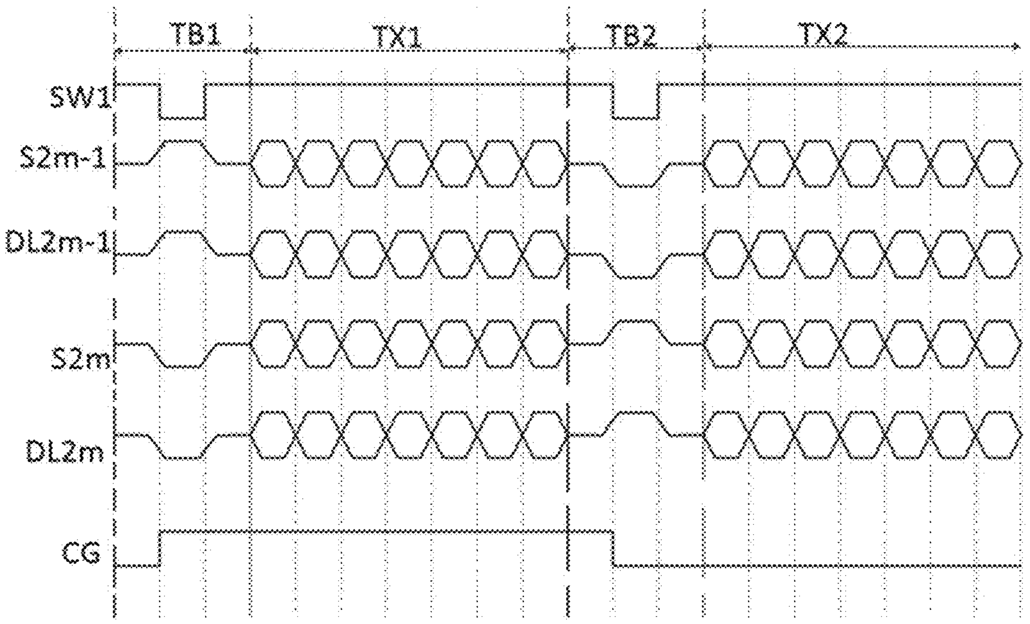
FIG. 12 is a working timing diagram of the driving circuit shown in FIG. 11.

In at least one embodiment shown in FIGS. 11, T1 and T2 are p-type transistors, T3 is a p-type transistor, T4 is an n-type transistor, T5 is a p-type transistor, and T6 is an n-type transistor;

As shown in FIG. 12, when at least one embodiment shown in FIG. 11 is working, the TB1 is the first blank time period, the TB2 is the second control time period, the TX1 is the first data writing-in time period, and the TX2 is the second data writing-in time period.

In the first blank time period TB1, SW1 provides a low voltage signal, T1 and T2 are turned on, S2*m*−1 provides a high voltage signal, S2*m* provides a low voltage signal, the (2m−1)th column of data line DL2*m*−1 is connected to a high voltage signal, the 2m column of data line DL2*m* is connected to a low voltage signal, the potential of NC1 is a high voltage, the potential of NC2 is a low voltage, T5 is turned on, CG is connected to VGH, the potential of CG is a high voltage, and T4 is turned on so that the OE and VGL are connected, and the OE outputs a low voltage signal;

In the first data writing-in time period TX1, the potential of CG is maintained at a high voltage;

In a part of the second blank time period TB2, SW1 provides a low voltage signal, T1 and T2 are turned on, S2*m*−1 provides a low voltage signal, S2*m* provides a high voltage signal, DL2*m*−1 is connected to a low voltage signal, DL2*m* is connected to a high voltage signal, the potential of NC1 is a low voltage, the potential of NC2 is a high voltage, T3 is turned on, OE and VGH are connected, the potential of OE is a high voltage, T6 is turned on, and CG outputs a low voltage signal;

In the second data writing-in period, TX2, the potential of CG is maintained at a low voltage.

Figure 13:
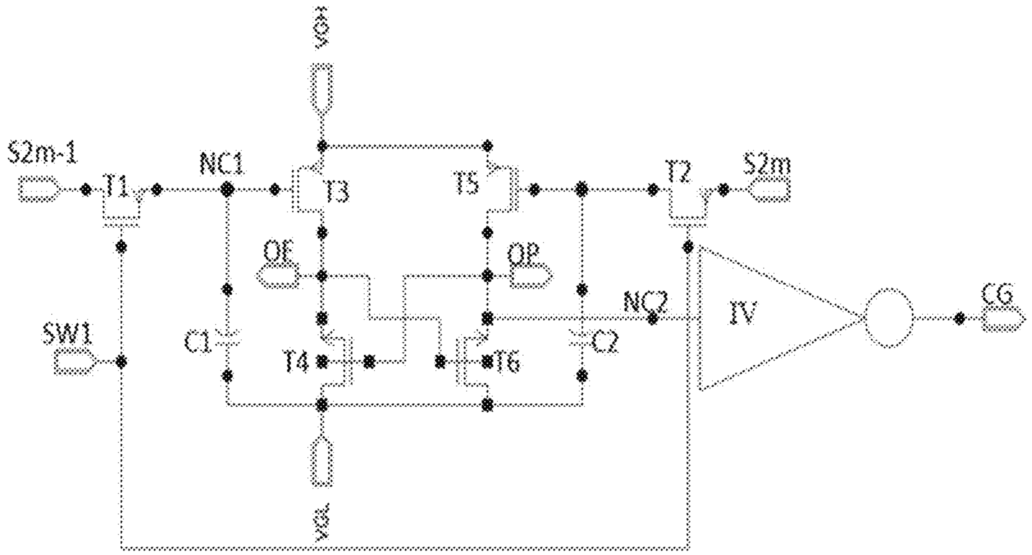
FIG. 13 is a circuit diagram of the driving circuit according to at least one embodiment of the present disclosure.

As shown in FIG. 13, on the basis of at least one embodiment shown in FIG. 10, the first switching circuit includes a first transistor T1, a second transistor T2, a first capacitor C1 and a second capacitor C2;

the gate electrode of the first transistor T1 is electrically connected to the first gating control line SW1, the source electrode of the first transistor is electrically connected to the (2m−1)th data output terminal S2*m*−1, and the drain electrode of the first transistor T1 is electrically connected to the first control node NC1;

the gate electrode of the second transistor T2 is electrically connected to the first gating control line SW1, the source electrode of the second transistor T2 is electrically connected to the 2mth data output terminal S2*m*, and the drain electrode of the second transistor T2 is electrically connected to the second control node NC2;

the first terminal of the first capacitor C1 is electrically connected to the first control node NC1, and the second terminal of the first capacitor C1 is electrically connected to the low voltage terminal VGL;

the first terminal of the second capacitor C2 is electrically connected to the second control node NC2, and the second terminal of the second capacitor C2 is electrically connected to the low voltage terminal VGL;

the output control circuit includes a third transistor T3 and a fourth transistor T4;

the gate electrode of the third transistor T3 is electrically connected to the first control node NC1, the source electrode of the third transistor T3 is electrically connected to the high voltage terminal VGH, and the drain electrode of the third transistor T3 is electrically connected to the output control terminal OE;

the gate electrode of the fourth transistor T4 is electrically connected to the first control node NC1, the source electrode of the fourth transistor T4 is electrically connected to the output control terminal OE, and the drain electrode of the fourth transistor T4 is electrically connected to the low voltage terminal VGL;

the output circuit includes a fifth transistor T5 and a sixth transistor T6;

the gate electrode of the fifth transistor T5 is electrically connected to the second control node NC2, the source electrode of the fifth transistor T5 is electrically connected to the high voltage terminal VGH, and the drain electrode of the fifth transistor T5 is electrically connected to the scanning output terminal OP;

the gate electrode of the sixth transistor T6 is electrically connected to the output control terminal OE, the source electrode of the sixth transistor T6 is electrically connected to the scanning output terminal OP, and the drain electrode of the sixth transistor T6 is electrically connected to the low voltage terminal VGL;

The inverting circuit includes an inverter IV;

The input terminal of the inverter IV is electrically connected to the scanning output terminal OP, the output terminal of the inverter IV is electrically connected to the scanning signal output terminal CG, the inverter IV is configured to perform phase inversion on the voltage signal that is connected to its input terminal, obtains the inverted voltage signal, and outputs the inverted voltage signal through the output terminal of the inverter IV.

In at least one embodiment of the scanning signal generation circuit shown in FIG. 13, the control voltage terminal is a second voltage terminal, the first voltage terminal is a high voltage terminal, and the second voltage terminal is a low voltage terminal, but is not limited thereto.

In at least one embodiment of the scanning signal generation circuit shown in FIG. 13, S2*m*−1 can be electrically connected to the (2m−1)th column of data line DL2*m*−1, and S2*m* can be electrically connected to the (2m−1)th column of data line DL2*m*.

When at least one embodiment of the scanning signal generation circuit shown in FIG. 13 is working, the first blank time period, the first data writing-in time period, the second blank time period and the second data writing-in time period can be set successively;

In at least part of the first blank time period, SW1 provides a low voltage signal, T1 and T2 are turned on, S2*m*−1 is high voltage signal, S2*m* is low voltage signal, DL2*m*−1 is connected to a high voltage signal, DL2*m* is connected to a low voltage signal, NC1 is a high voltage, NC2 is a low voltage, T5 is turned on, OP is connected to VGH, OP is a high voltage, T4 is turned on to connect OE and VGL, OE outputs a low voltage signal, and CG outputs a low voltage signal;

In the first data writing-in period, the potential of CG is maintained at a low voltage;

In at least part of the second blank time period, SW1 provides a low voltage signal, T1 and T2 are turned on, S2*m*−1 is low voltage signal, S2*m* is high voltage signal, DL2*m*−1 is connected to a low voltage signal, DL2*m* is connected to a high voltage signal, NC1 is a low voltage, NC2 is a high voltage, T3 is turned on, OE and VGH are connected, OE is a high voltage, T6 is turned on, OP outputs a low voltage signal, CG outputs a high voltage signal;

In the second data writing-in time period, the potential of CG is maintained at a high voltage.

Figure 14:
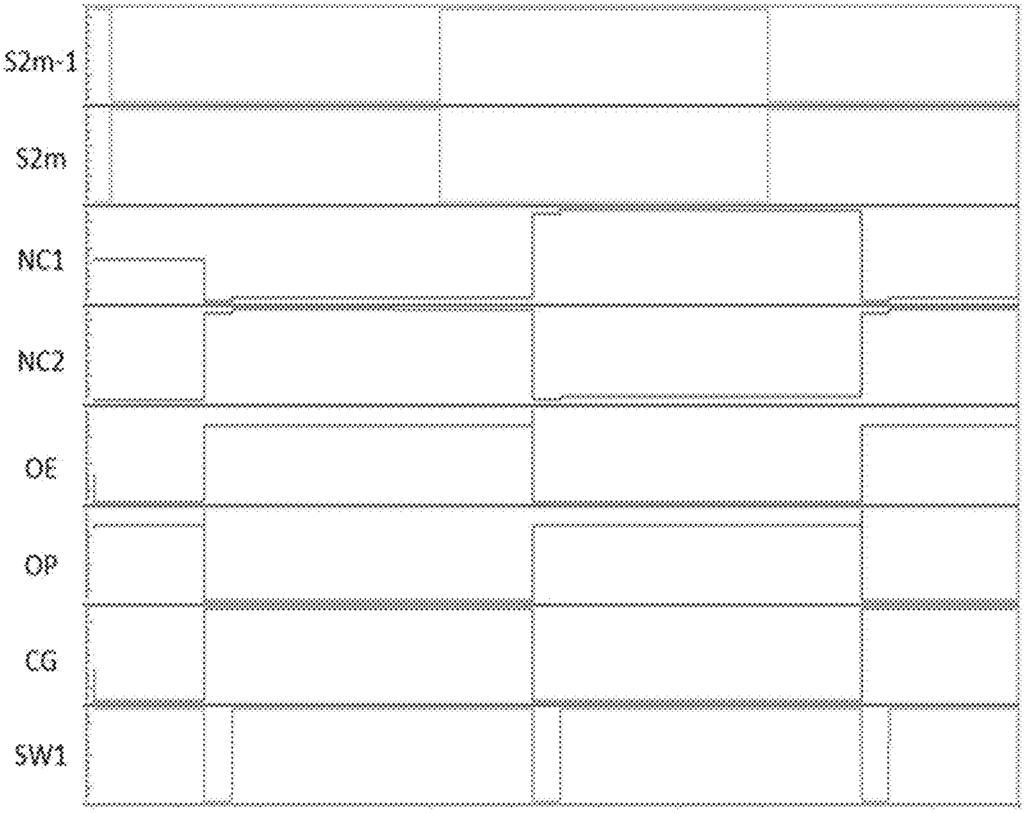
FIG. 14 is a simulation working timing diagram of the driving circuit shown in FIG. 13.

FIG. 14 is a simulation timing sequence diagram of the scanning signal generation circuit shown in FIG. 13.

In at least one embodiment of the present disclosure, the scanning signal generation circuit includes a first output control circuit, a second output control circuit, a third output control circuit, a fourth output control circuit and a second output circuit;

the first output control circuit is electrically connected to a first control node, a third control node and a connection node respectively, and is configured to control to connect or disconnect the third control node and the connection node under the control of the potential of the first control node;

the second output control circuit is electrically connected to a second control node, a fourth control node and the connection node respectively, and is configured to control to connect or disconnect the fourth control node and the connection node under the control of a potential of the second control node;

the third output control circuit is electrically connected to the scanning output terminal, an output control terminal, a first voltage terminal and the third control node respectively, and is configured to control to connect or disconnect the output control terminal and the first voltage terminal under the control of the signal provided by the scanning output terminal, and control to connect or disconnect the output control terminal and the third control node;

the fourth output control circuit is electrically connected to the output control terminal, the scanning output terminal, the first voltage terminal and the fourth control node respectively, and is configured to control to connect or disconnect the scanning output terminal and the first voltage terminal under the control of the output control signal provided by the output control terminal, and control to connect or disconnect the scanning output terminal and the fourth control node;

the second output circuit is electrically connected to the scanning output terminal, the first voltage terminal, the second voltage terminal and the scanning signal output terminal respectively, is configured to control to connect or disconnect the scanning signal output terminal and the first voltage terminal being under the control of the signal provided by the scanning output terminal, control to connect or disconnect the scanning signal output terminal and the second voltage terminal.

In the specific embodiment, the scanning signal generation circuit may include a first output control circuit, a second output control circuit, a third output control circuit, the fourth output control circuit and the second output circuit; the first output control circuit controls to connect or disconnect the third control node and the connection node under the control of the potential of the first control node; the second output control circuit controls to connect or disconnect the fourth control node and the connection node under the control of the potential of the second control node; the third output control circuit controls to connect or disconnect the output control terminal and the first voltage terminal under the control of the signal provided by the scanning output terminal, and controls to connect or disconnect the output control terminal and the third control node; the fourth output control circuit controls to connect or disconnect the scanning output terminal and the first voltage terminal under the control of the output control signal, and controls to connect or disconnect the scanning output terminal and the fourth control node; the second output circuit controls to connect or disconnect the scanning signal output terminal and the first voltage terminal under the control of the signal provided by the scanning output terminal, and controls to connect or disconnect the scanning signal output terminal and the second voltage terminal.

Optionally, the connection node is electrically connected directly to the second voltage terminal; or the scanning signal generation circuit further includes a connection control circuit, a fifth output control circuit and a sixth output control circuit;

the connection control circuit is electrically connected to the third gating control line, the connection node and the second voltage terminal respectively, and is configured to control to connect or disconnect the connection node and the second voltage terminal under the control of the third gating control signal provided by the third gating control line;

the fifth output control circuit is electrically connected to the third gating control line, the first voltage terminal and the output control terminal respectively, and is configured to control to connect or disconnect the first voltage terminal and the output control terminal under the control of the third gating control signal;

The sixth output control circuit is electrically connected to the third gating control line, the first voltage terminal and the scanning output terminal respectively, and is configured to control to connect or disconnect the first voltage terminal and the scanning output terminal under the control of the third gating control signal.

Figure 15:
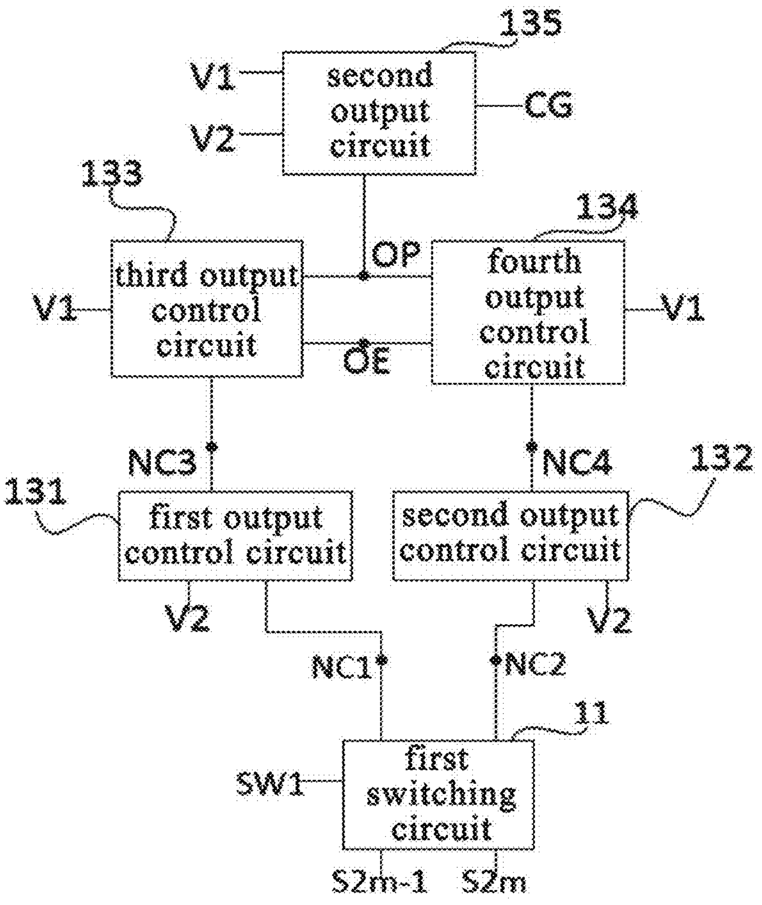
FIG. 15 is a structural diagram of the driving circuit according to at least one embodiment of the present disclosure.

As shown in FIG. 15, the first switching circuit 11 is respectively electrically connected to the first gating control line SW1, the (2m−1)th data output terminal S2*m*−1 of the source driver, the 2mth data output terminal S2*m* of the source driver, the first control node NC1 and the second control node NC2, is configured to control to connect or disconnect the (2m−1)th data output terminal S2*m*−1 and the first control node NC1 under the control of the first gating control signal provided by the first gating control line SW1, and to connect or disconnect the 2mth data output terminal S2*m* and the second control node NC2;

the scanning signal generation circuit includes a first output control circuit 131, a second output control circuit 132, a third output control circuit 133, a fourth output control circuit 134 and a second output circuit 135;

the first output control circuit 131 is electrically connected to the first control node NC1, the third control node NC3 and the connection node respectively, and is configured to control to connect or disconnect the third control node NC3 and the connection node under the control of the potential of the first control node NC1, the connection node is directly electrically connected to the second voltage terminal V2;

the second output control circuit 132 is electrically connected to the second control node NC2, the fourth control node NC4 and the connection node respectively, and is configured to control to connect or disconnect the fourth control node NC4 and the connection node under the control of the potential of the second control node NC2;

the third output control circuit 133 is electrically connected to the scanning output terminal OP, the output control terminal OE, the first voltage terminal V1 and the third control node NC3 respectively, and is configured to control to connect or disconnect the output control terminal OE and the first voltage terminal V1 under the control of the signal provided by the scanning output terminal OP, and control to connect or disconnect the output control terminal OE and the third control node NC3;

the fourth output control circuit 134 is electrically connected to the output control terminal OE, the scanning output terminal OP, the first voltage terminal V1 and the fourth control node NC4 respectively, and is configured to control to connect or disconnect the scanning output terminal OP and the first voltage terminal V1 under the control of the output control signal provided by the output control terminal OE, and to control to connect or disconnect the scanning output terminal OP and the fourth control node NC4;

The second output circuit 135 is electrically connected to the scanning output terminal OP, the first voltage terminal V1, the second voltage terminal V2 and he scanning signal output terminal CG respectively, is configured to control to connect or disconnect the scanning signal output terminal CG and the first voltage terminal V1 under the control of the signal provided by the scanning output terminal OP, control to connect or disconnect the scanning signal output terminal CG and the second voltage terminal V2.

Optionally, the first output control circuit includes a seventh transistor, and the second output control circuit includes an eighth transistor;

a gate electrode of the seventh transistor is electrically connected to the first control node, a first electrode of the seventh transistor is electrically connected to the third control node, and a second electrode of the seventh transistor is electrically connected to the second voltage terminal;

a gate electrode of the eighth transistor is electrically connected to the second control node, a first electrode of the eighth transistor is electrically connected to the fourth control node, and a second electrode of the eighth transistor is electrically connected to the second voltage terminal;

the third output control circuit includes a ninth transistor and a tenth transistor;

a gate electrode of the ninth transistor is electrically connected to the scanning output terminal, a first electrode of the ninth transistor is electrically connected to the first voltage terminal, and a second electrode of the ninth transistor is electrically connected to the output control terminal;

a gate electrode of the tenth transistor is electrically connected to the scanning output terminal, a first electrode of the tenth transistor is electrically connected to the output control terminal, and a second electrode of the tenth transistor is electrically connected to the third control node;

the fourth output control circuit includes an eleventh transistor and a twelfth transistor;

a gate electrode of the eleventh transistor is electrically connected to the output control terminal, a first electrode of the eleventh transistor is electrically connected to the first voltage terminal, and a second electrode of the eleventh transistor is electrically connected to the scanning output terminal;

a gate electrode of the twelfth transistor is electrically connected to the output control terminal, a first electrode of the twelfth transistor is electrically connected to the scanning output terminal, and a second electrode of the twelfth transistor is electrically connected to the fourth control node;

the second output circuit includes a thirteenth transistor and a fourteenth transistor;

a gate electrode of the thirteenth transistor is electrically connected to the scanning output terminal, a first electrode of the thirteenth transistor is electrically connected to the first voltage terminal, and a second electrode of the thirteenth transistor is electrically connected to the scanning signal output terminal;

a gate electrode of the fourteenth transistor is electrically connected to the scanning output terminal, a first electrode of the fourteenth transistor is electrically connected to the scanning signal output terminal, and a second electrode of the fourteenth transistor is electrically connected to the second voltage terminal.

Figure 16:
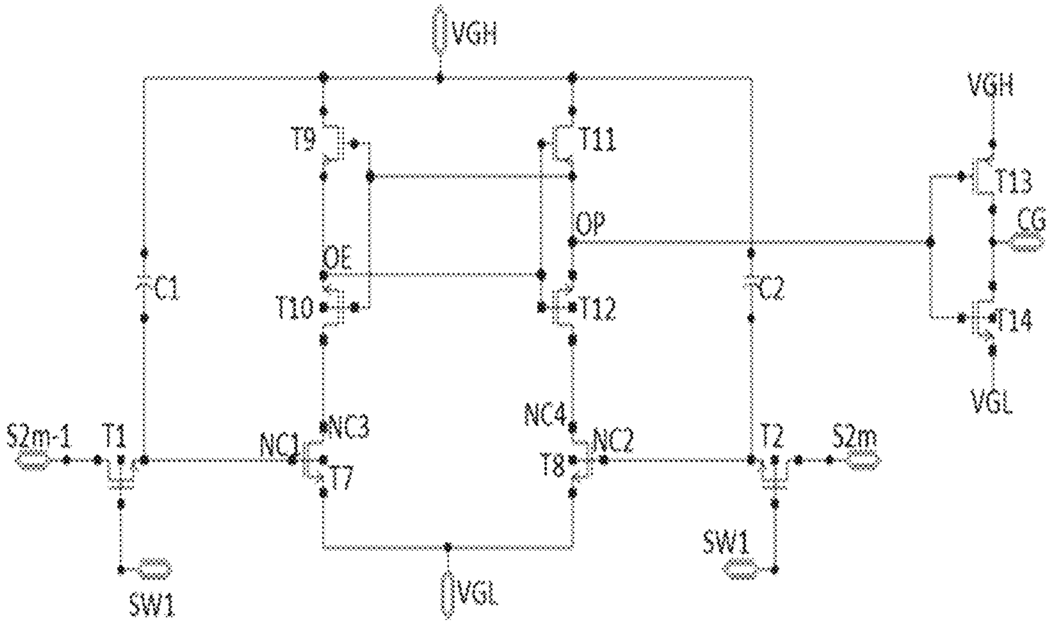
FIG. 16 is a circuit diagram of the driving circuit according to at least one embodiment of the present disclosure.

As shown in FIG. 16, on the basis of at least one embodiment of the scanning signal generation circuit shown in FIG. 15, the first switching circuit comprises a first transistor T1, a second transistor T2, a first capacitor C1 and a second capacitor C2;

the gate electrode of the first transistor T1 is electrically connected to the first gating control line SW1, the source electrode of the first transistor is electrically connected to the (2m−1)th data output terminal S2*m*−1, and the drain electrode of the first transistor T1 is electrically connected to the first control node NC1;

the gate electrode of the second transistor T2 is electrically connected to the first gating control line SW1, the source electrode of the second transistor T2 is electrically connected to the 2mth data output terminal S2*m*, and the drain electrode of the second transistor T2 is electrically connected to the second control node NC2;

the first terminal of the first capacitor C1 is electrically connected to the first control node NC1, and the second terminal of the first capacitor C1 is electrically connected to the high voltage terminal VGH;

the first terminal of the second capacitor C2 is electrically connected to the second control node NC2, and the second terminal of the second capacitor C2 is electrically connected to the high voltage terminal VGH;

the first output control circuit includes a seventh transistor T7, and the second output control circuit includes an eighth transistor T8;

the gate electrode of the seventh transistor T7 is electrically connected to the first control node NC1, the source electrode of the seventh transistor T7 is electrically connected to the third control node NC3, and the drain electrode of the seventh transistor T7 is electrically connected to the low voltage terminal VGL;

the gate electrode of the eighth transistor T8 is electrically connected to the second control node NC2, the source electrode of the eighth transistor T8 is electrically connected to the fourth control node NC4, and the drain electrode of the eighth transistor T8 is electrically connected to the low voltage terminal VGL;

the third output control circuit includes a ninth transistor T9 and a tenth transistor T10;

the gate electrode of the ninth transistor T9 is electrically connected to the scanning output terminal OP, the source electrode of the ninth transistor T9 is electrically connected to the high voltage terminal VGH, and the drain electrode of the ninth transistor T9 is electrically connected to the output control terminal OE;

the gate electrode of the tenth transistor T10 is electrically connected to the scanning output terminal OP, the source electrode of the tenth transistor T10 is electrically connected to the output control terminal OE, and the drain electrode of the tenth transistor T10 is electrically connected to the third control node NC3;

the fourth output control circuit includes an eleventh transistor T11 and a twelfth transistor T12;

the gate electrode of the eleventh transistor T11 is electrically connected to the output control terminal OE, the source electrode of the eleventh transistor T11 is electrically connected to the high voltage terminal VGH, and the drain electrode of the eleventh transistor T11 is electrically connected to the scanning output terminal OP;

the gate electrode of the twelfth transistor T12 is electrically connected to the output control terminal OE, the source electrode of the twelfth transistor T12 is electrically connected to the scanning output terminal OP, and the drain electrode of the twelfth transistor T12 is electrically connected to the fourth control node NC4;

the second output circuit includes a thirteenth transistor T13 and a fourteenth transistor T14;

the gate electrode of the thirteenth transistor T13 is electrically connected to the scanning output terminal OP, the source electrode of the thirteenth transistor T13 is electrically connected to the high voltage terminal VGH, and the drain electrode of the thirteenth transistor T13 is electrically connected to the scanning signal output terminal CG;

The gate electrode of the fourteenth transistor T14 is electrically connected to the scanning output terminal OP, the source electrode of the fourteenth transistor T14 is electrically connected to the scanning signal output terminal CG, and the drain electrode of the fourteenth transistor T14 is electrically connected to the low voltage terminal VGL.

In at least one embodiment of the scanning signal generation circuit shown in FIGS. 16, T1 and T2 may be n-type transistors, T7 may be n-type transistors, T8 may be n-type transistors, T9 may be p-type transistors, T10 may be n-type transistors, T11 may be p-type transistors, T12 may be n-type transistors, T13 may be p-type transistors, and T14 may be n-type transistors.

When at least one embodiment of the scanning signal generation circuit shown in FIG. 16 is working, the first blank time period, the first data writing-in time period, the second blank time period and the second data writing-in time period are successively arranged;

In at least part of the first blank time period, SW1 outputs a high voltage signal, S2*m*−1 outputs a high voltage signal, S2*m* outputs a low voltage signal, the potential of NC1 is a high voltage, the potential of NC2 is a low voltage, T7 is turned on, T8 is turned off, then the potential of NC3 is less than the potential of NC4, the potential of OE is less than that of OP, T11 is turned on, OP and VGH are connected, OP outputs a high voltage signal, T14 is turned on, and CG outputs a low voltage signal;

In the first data writing-in time period, the potential of CG is maintained at a low voltage;

In at least part of the second blank time period, SW1 outputs a high voltage signal, S2*m*−1 outputs a low voltage signal, S2*m* outputs a high voltage signal, NC1 has a low voltage, NC2 has a high voltage, T7 is turned off, T8 is turned on, then the potential of NC4 is less than the potential of NC3, the potential of OP is less than that of OE, T12 is turned on, T8 is turned on, OP and VGL are connected, OP outputs a low voltage signal, T13 is turned on, and CG outputs a high voltage signal.

Figure 17:
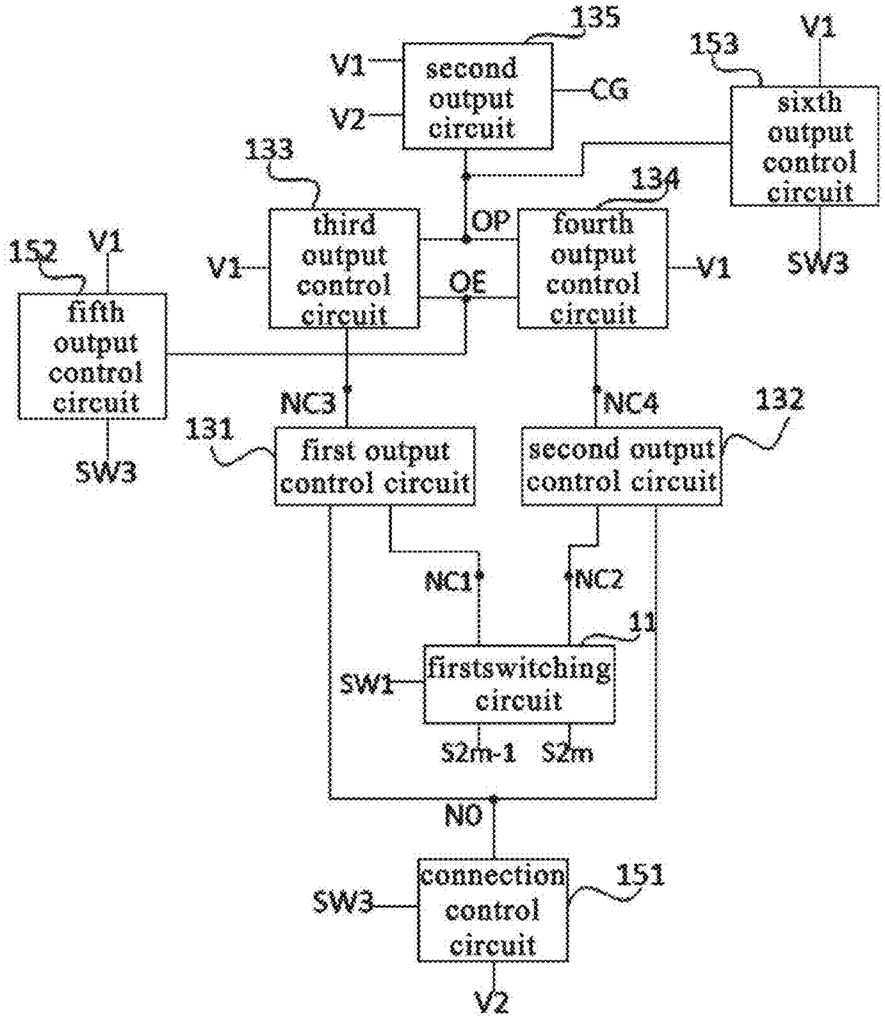
FIG. 17 is a structural diagram of the driving circuit according to at least one embodiment of the present disclosure.

As shown in FIG. 17, on the basis of at least one embodiment of the scanning signal generation circuit shown in FIG. 15, the scanning signal generation circuit may further include a connection control circuit 151, a fifth output control circuit 152 and a sixth output control circuit 153;

the connection control circuit 151 is electrically connected to the third gating control line SW3, the connection node NO and the second voltage terminal V2 respectively, and is configured to control to connect or disconnect the connection node NO and the second voltage terminal V2 under the control of the third gating control signal provided by the third gating control line SW3;

the fifth output control circuit 152 is electrically connected to the third gating control line SW3, the first voltage terminal V1 and the output control terminal OE respectively, and is configured to control to connect or disconnect the first voltage terminal V1 and the output control terminal OE under the control of the third gating control signal;

The sixth output control circuit 153 is electrically connected to the third gating control line SW3, the first voltage terminal V1 and the scanning output terminal OP respectively, and is configured to connect or disconnect the first voltage terminal V1 and the scanning output terminal OP under the control of the third gating control signal.

At least one embodiment of the scanning signal generation circuit shown in FIG. 16 of the present disclosure is in operation, the connection control circuit 41 controls to connect or disconnect the connection node NO and the second voltage terminal V2 under the control of the third gating control signal; the fifth output control circuit 152 controls to connect or disconnect the first voltage terminal V1 and the output control terminal OE under the control of the third gating control signal; the sixth output control circuit 153 controls to connect or disconnect the first voltage terminal V1 and the scanning output terminal OP under the control of the third gating control signal.

Optionally, the connection control circuit includes a fifteenth transistor, the fifth output control circuit includes a sixteenth transistor, and the sixth output control circuit includes a seventeenth transistor;

a gate electrode of the fifteenth transistor is electrically connected to the third gating control line, a first electrode of the fifteenth transistor is electrically connected to the connection node, and a second electrode of the fifteenth transistor is electrically connected to the second voltage terminal;

a gate electrode of the sixteenth transistor is electrically connected to the third gating control line, a first electrode of the sixteenth transistor is electrically connected to the first voltage terminal, and a second electrode of the sixteenth transistor is electrically connected to the output control terminal;

a gate electrode of the seventeenth transistor is electrically connected to the third gating control line, a first electrode of the seventeenth transistor is electrically connected to the first voltage terminal, and a second electrode of the seventeenth transistor is electrically connected to the scanning output terminal.

Figure 18:
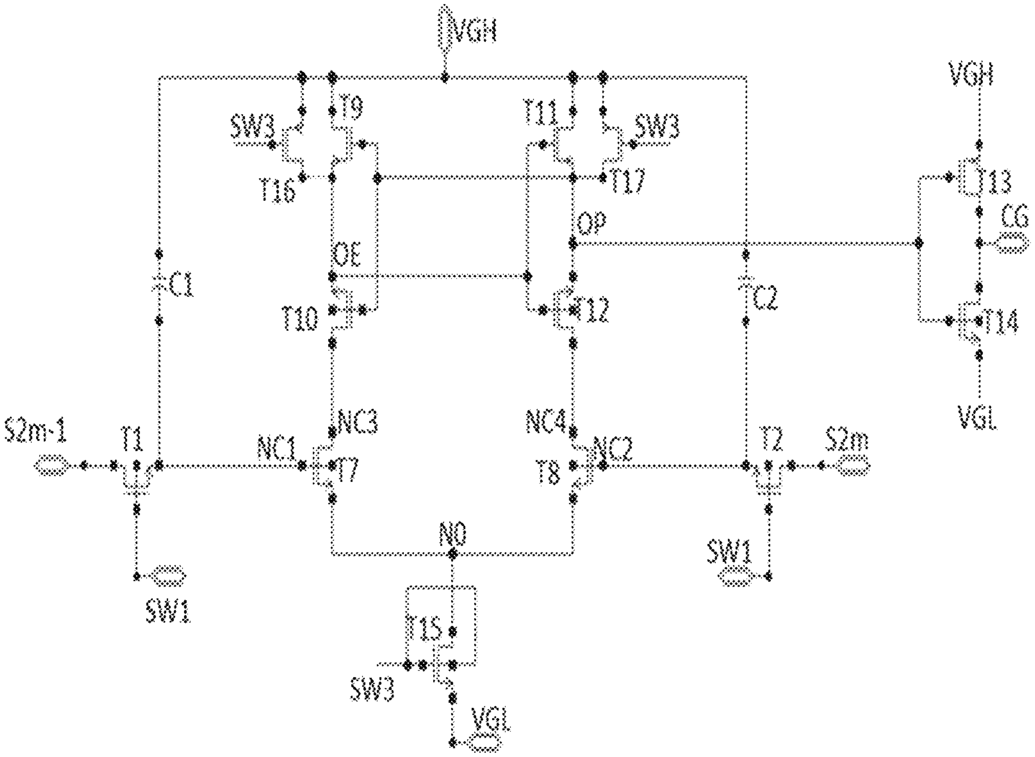
FIG. 18 is a circuit diagram of the driving circuit according to at least one embodiment of the present disclosure.

The difference between at least one embodiment of the scanning signal generation circuit shown in FIG. 18 and at least one embodiment of the scanning signal generation circuit shown in FIG. 16 is that: at least one embodiment of the scanning signal generation circuit shown in FIG. 18 further includes a fifteenth transistor T15, a sixteenth transistor T16 and a seventeenth transistor T17;

the gate electrode of the fifteenth transistor T15 is electrically connected to the third gating control line SW3, the source electrode of the fifteenth transistor T15 is electrically connected to the connection node NO, and the drain electrode of the fifteenth transistor T15 is electrically connected to the low voltage terminal VGL;

the gate electrode of the sixteenth transistor T16 is electrically connected to the third gating control line SW3, the source electrode of the sixteenth transistor T16 is electrically connected to the high voltage terminal VGH, and the drain electrode of the sixteenth transistor T16 is electrically connected to the output control terminal OE;

the gate electrode of the seventeenth transistor T17 is electrically connected to the third gating control line SW3, the source electrode of the seventeenth transistor T17 is electrically connected to the high voltage terminal VGH, and the drain electrode of the seventeenth transistor T17 is electrically connected to the scanning output terminal OP.

In at least one embodiment of the scanning signal generation circuit shown in FIG. 18, T15 is an n-type transistor, T16 is a p-type transistor, and T17 is a p-type transistor.

When at least one embodiment of the scanning signal generation circuit shown in FIG. 18 is operating, When SW3 provides a high voltage signal, T15 is turned on, NO and VGL are connected, and the scanning signal generation circuit shown in FIG. 16 can work.

When SW3 provides a low voltage signal, T16 and T17 are turned on, so that both OE and OP output a high voltage signal, and CG outputs a low voltage signal.

Figure 19:
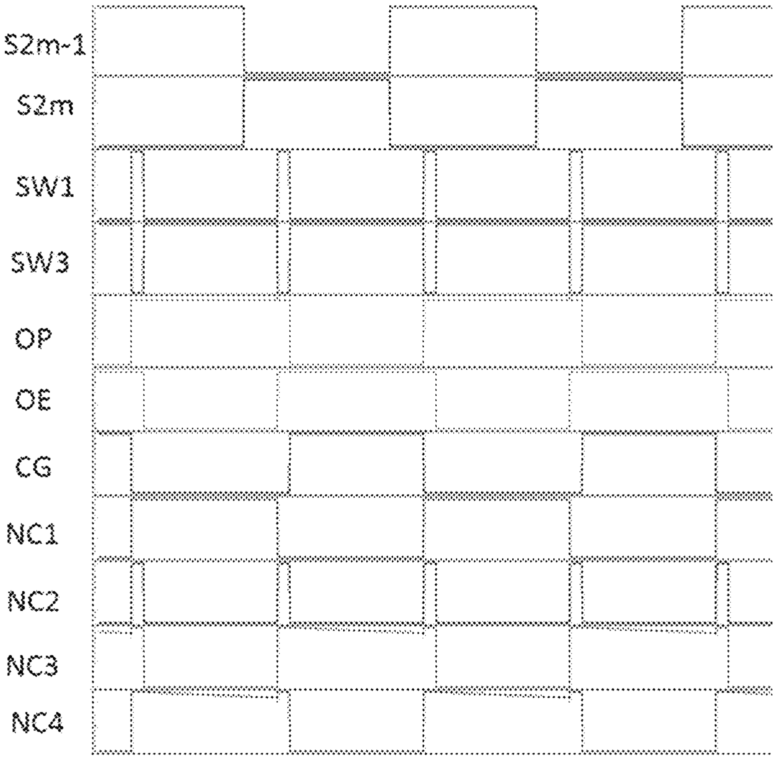
FIG. 19 is a simulation working timing diagram of the driving circuit shown in FIG. 18.

FIG. 19 is a simulation working timing diagram of the scanning signal generation circuit shown in FIG. 18.

The driving method of the embodiment of the present disclosure is applied to the driving circuit, and the driving method includes: in at least part of the blank time period between the two frames of display time;

Controlling, by the first switching circuit, to write the data signal provided by at least two data output terminals of the source driver into the scanning signal generation circuit under the control of the first gating control signal;

Generating, by the scanning signal generation circuit, a scanning signal according to the data signal provided by at least two data output terminals, and outputting the scanning signal to a corresponding column of scanning line of the display panel through the scanning signal output terminal.

In the reset control method of the embodiment of the disclosure, in at least part of the blank time period between the two frames of display time; the first switching circuit controls to write the data signal provided by at least two data output terminals of the source driver to the scanning signal generation circuit under the control of the first gating control signal; the scanning signal generation circuit generates a scanning signal according to the data signal provided by the at least two data output terminals, and outputs the scanning signal to the corresponding column of scanning line of the display panel through the scanning signal output terminal.

Optionally, at least two data output terminals are electrically connected to different columns of data lines included in the display panel respectively;

The driving method further includes;

In the data writing-in time period in a frame of display time, providing, by the data output terminal, a data voltage to a data line that is electrically connected to the date output terminal.

In the specific embodiment, in the data writing-in time period in a frame of display time, the data output terminal provides a data voltage to a data line that is electrically connected to the data output terminal.

In at least one embodiment of the present disclosure, the driving circuit further includes a second switching circuit;

The driving method further includes:

In the data writing-in time period in a frame of display time, controlling, by the second switching circuit, to connect or disconnect the data output terminal of the source driver and the corresponding column of data line of the display panel under the control of the second gating control signal.

In the specific embodiment, the driving circuit may also include a second switching circuit, in the data writing-in time period in a frame of display time, the second switching circuit controls to connect the data output terminal and the corresponding column of data line of the display panel under the control of the second gating control signal, so as to provide a data voltage to the data line.

the pixel circuit of at least one embodiment of the present disclosure includes a light-emitting element, a control circuit and a light-emitting driving circuit;

the light-emitting driving circuit is electrically connected to the first node, the second node and the third node respectively, and is configured to generate a driving current flowing through the second node and the third node under the control of the potential of the first node;

the light-emitting element is electrically connected to the third node;

the control circuit is electrically connected to the first gate line, the scanning line, the first node and the third node respectively, and is configured to control to connect or disconnect the first node and the third node under the control of the first gate driving signal provided by the first gate line and the scanning signal provided by the scanning line.

Figure 20:
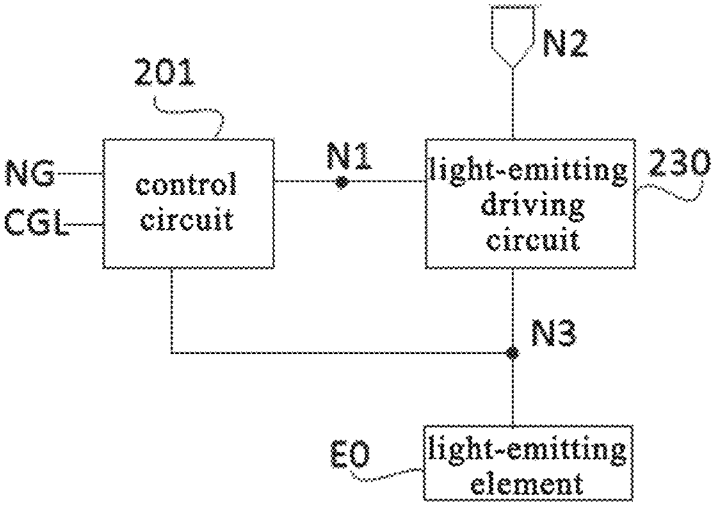
FIG. 20 is a structural diagram of the pixel circuit according to at least one embodiment of the present disclosure.

In the specific embodiment, the pixel circuit may comprise a control circuit and a light-emitting driving circuit, the light-emitting driving circuit generates a driving current under the control of the potential of the first node, and the control circuit controls to connect or disconnect the first node and the third node under the control of the first gate driving signal provided by the first gate line and the scanning signal provided by the scanning line;

As shown in FIG. 20, the pixel circuit may comprise a light-emitting element E0, a control circuit 201 and a light-emitting driving circuit 230;

the light-emitting driving circuit 200 is electrically connected to the first node N1, the second node N2 and the third node N3 respectively, and is configured to generate a driving current flowing through the second node N2 and the third node N3 under the control of the potential of the first node N1;

the light-emitting element E0 is electrically connected to the third node N3;

The control circuit 201 is electrically connected to the first gate line NG, the scanning line CGL, the first node N1 and the third node N3 respectively, and is configured to control to connect or disconnect the first node N1 and the third node N3 under the control of the first gate driving signal provided by the first gate line NG and the scanning signal provided by the scanning line CGL.

In at least one embodiment of the present disclosure, the control circuit includes a first control circuit and a second control circuit;

the first control circuit is electrically connected to the first gate line, the first node and an intermediate node respectively, and a second terminal of the first control circuit is electrically connected to the intermediate node, is configured to control to connect or disconnect the first node and the intermediate node under the control of the first gate driving signal provided by the first gate line;

the second control circuit is electrically connected to the scanning line, the intermediate node and the third node respectively, and is configured to control to connect or disconnect the intermediate node and the third node under the control of the scanning signal provided by the scanning line.

In the specific embodiment, the control circuit may include a first control circuit and a second control circuit, the first control circuit controls to connect or disconnect the first node and the intermediate node under the control of the first gate driving signal provided by the first gate line, and the second control circuit controls to connect or disconnect the intermediate node and the third node under the control of the scanning signal provided by the scanning line.

Figure 21:
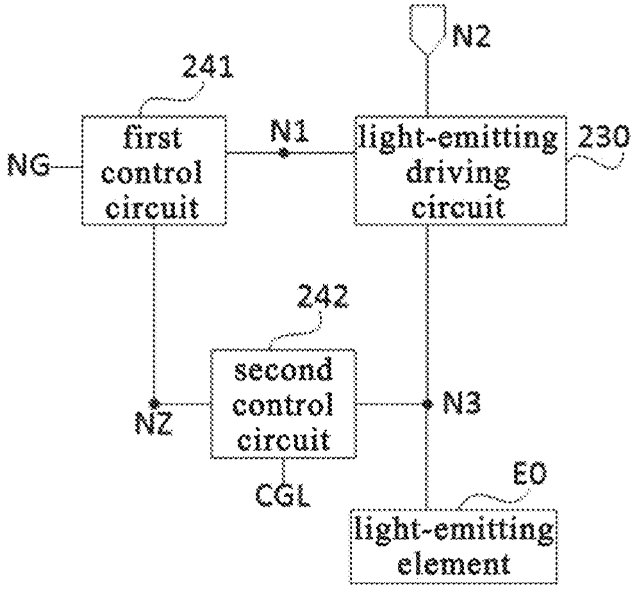
FIG. 21 is a structural diagram of the pixel circuit according to at least one embodiment of the present disclosure.

As shown in FIG. 21, on the basis of at least one embodiment of the pixel circuit shown in FIG. 20, the control circuit includes a first control circuit 241 and a second control circuit 242;

the first control circuit 241 is electrically connected to the first gate line NG, the first node N1 and the intermediate node NZ respectively, and the second terminal of the first control circuit 241 is electrically connected to the intermediate node NZ, is configured to control to connect or disconnect the first node N1 and the intermediate node NZ under the control of the first gate driving signal provided by the first gate line NG;

the second control circuit 242 is electrically connected to the scanning line CGL, the intermediate node NZ and the third node N3 respectively, and is configured to control to connect or disconnect the intermediate node NZ and the third node N3 under the control of the scanning signal provided by the scanning line CGL.

In at least one embodiment of the present disclosure, the control circuit comprises a first control circuit and a second control circuit;

the first control circuit is electrically connected to the first gate line, the third node and the intermediate node respectively, and is configured to control to connect or disconnect the third node and the intermediate node under the control of the first gate driving signal provided by the first gate line;

the second control circuit is electrically connected to the scanning line, the intermediate node and the first node respectively, and is configured to control to connect or disconnect the intermediate node and the first node under the control of the scanning signal provided by the scanning line.

In the specific embodiment, the control circuit may include a first control circuit and a second control circuit, the first control circuit controls to connect or disconnect the third node and the intermediate node under the control of the first gate driving signal provided by the first gate line; the second control circuit controls to connect or disconnect the intermediate node and the first node under the control of the scanning signal provided by the scanning line.

Figure 22:
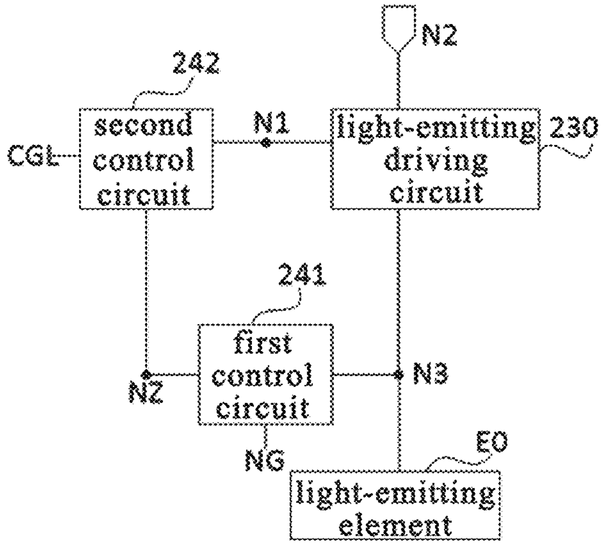
FIG. 22 is a structural diagram of the pixel circuit according to at least one embodiment of the present disclosure.

As shown in FIG. 22, on the basis of at least one embodiment of the pixel circuit shown in FIG. 20, the control circuit includes a first control circuit 241 and a second control circuit 242;

the first control circuit 241 is electrically connected to the first gate line NG, the third node N3 and the intermediate node NZ respectively, and is configured to control to connect or disconnect the third node N3 and the intermediate node NZ under the control of the first gate driving signal provided by the first gate line NG;

the second control circuit 242 is electrically connected to the scanning line CGL, the intermediate node NZ and the first node N1 respectively, and is configured to control to connect or disconnect the intermediate node NZ and the first node N1 under the control of the scanning signal provided by the scanning line CGL.

Optionally, the first control circuit includes a first control transistor, and the second control circuit comprises a second control transistor;

a gate electrode of the first control transistor is electrically connected to the first gate line, a first electrode of the first control transistor is electrically connected to the first node, and a second electrode of the first control transistor is electrically connected to the intermediate node;

a gate electrode of the second control transistor is electrically connected to the scanning line, a first electrode of the second control transistor is electrically connected to the intermediate node, and a second electrode of the second control transistor is electrically connected to the third node.

Optionally, the first control circuit includes a first control transistor, and the second control circuit includes a second control transistor;

a gate electrode of the first control transistor is electrically connected to the first gate line, a first electrode of the first control transistor is electrically connected to the intermediate node, and a second electrode of the first control transistor is electrically connected to the third node;

a gate electrode of the second control transistor is electrically connected to the scanning line, a first electrode of the second control transistor is electrically connected to the first node, and a second electrode of the second control transistor is electrically connected to the intermediate node.

Optionally, the light-emitting element may be an organic light-emitting diode, but is not limited to this. In actual operation, the light-emitting element can also be other types of light-emitting diodes.

In at least one embodiment of the present disclosure, the pixel circuit may also comprise a first initialization circuit;

the first initialization circuit is electrically connected to the first initial control terminal, the first initial voltage terminal and the second node respectively, and is configured to write the first initial voltage provided by the first initial voltage terminal into the second node under the control of a first initial control signal provided by the first initial control terminal.

In specific implementation, the display period may include the first initialization time period and the second initialization time period set successively;

in the first initialization time period, the control circuit controls to connect the first node and the third node under the control of the first gate driving signal and the scanning signal; the first initialization circuit writes the first initial voltage into the second node under the control of the first initial control signal; the light-emitting driving circuit controls to connect the second node and the third node under the control of the potential of the first node;

In the second initialization time period, the control circuit controls to disconnect the first node from the third node under the control of the first gate driving signal and the scanning signal; the first initialization circuit writes the first initial voltage to the second node under the control of the first initial control signal; and the light-emitting driving circuit controls to connect the second node and the third node under the control of the potential of the first node.

When the pixel circuit of at least one embodiment of the present disclosure is working, in the first initialization time period, before the data is written, the potentials of the first node, the second node and the third node are initialized, so as to reduce the difference in subsequent charging, in the second initialization time period, the first initialization circuit writes the first initial voltage to the second node, and the light-emitting driving circuit controls to connect the second node and the third node, so that the driving transistor included in the light-emitting driving circuit is in a bias state, and the hysteresis phenomenon can be improved.

Optionally, the pixel circuit may further include a second initialization circuit;

the second initialization circuit is electrically connected to the second initial control terminal, the second initial voltage terminal and the third node respectively, and is configured to write the second initial voltage provided by the second initial voltage terminal into the third node under the control of the second initial control signal provided by the second initial control terminal.

In specific embodiments, the pixel circuit may also include a second initialization circuit;

In the third initialization time period arranged between the first initialization time period and the second initialization time period, before the data writing-in time period, the second initialization circuit writes the second initial voltage into the third node under the control of the second initial control signal, so that at the beginning of the data writing-in time period, the driving transistor included in the light-emitting driving circuit can be turned on, so as to facilitate data voltage writing and threshold voltage compensation.

the pixel circuit according to at least one embodiment of the present disclosure may also include a data writing-in circuit, a first light-emitting control circuit, a second light-emitting control circuit and an energy storage circuit;

the data writing-in circuit is electrically connected to the second gate line, the data line and the second node respectively, and is configured to writing the data voltage provided by the data line into the second node under the control of the second gate driving signal provided by the second gate line;

the first light-emitting control circuit is electrically connected to the light-emitting control line, the power supply voltage terminal and the second node respectively, and is configured to control to connect or disconnect the power supply voltage terminal and the second node under the control of the light-emitting control signal provided by the light-emitting control line;

the second light-emitting control circuit is electrically connected to the light-emitting control line, the third node and the first electrode of the light-emitting element respectively, and is configured to control to connect the third node and the first terminal of the light-emitting element under the control of the light-emitting control signal, and connect the second terminal of the light-emitting element and the third voltage terminal;

The energy storage circuit is electrically connected to the first node and is configured to store electric energy.

In the specific embodiment, the pixel circuit may also include a data writing-in circuit, a first light-emitting control circuit, a second light-emitting control circuit and an energy storage circuit; the data writing-in circuit is configured to write the data voltage into the second node, the first light-emitting control circuit and the second light-emitting control circuit are configured to control the conduction light-emitting path, and the energy storage circuit is configured to store electric energy.

Optionally, the third voltage terminal may be a low-level terminal or a ground terminal, but is not limited to this.

In at least one embodiment of the present disclosure, the pixel circuit may also include a third initialization circuit;

the third initialization circuit is electrically connected to the first initial control terminal, the third initial voltage terminal and the first electrode of the light-emitting element respectively, and is configured to write the third initial voltage provided by the third initial voltage terminal into the first electrode of the light-emitting element under the control of the first initial control signal provided by the first initial control terminal.

In the specific embodiment, the pixel circuit may also include a third initialization circuit, under the control of the first initial control signal, the third initialization circuit writes the third initial voltage into the first electrode of the light-emitting element to control the light-emitting element not to emit light, and to remove the residual charge of the first electrode of the light-emitting element.

Figure 23:
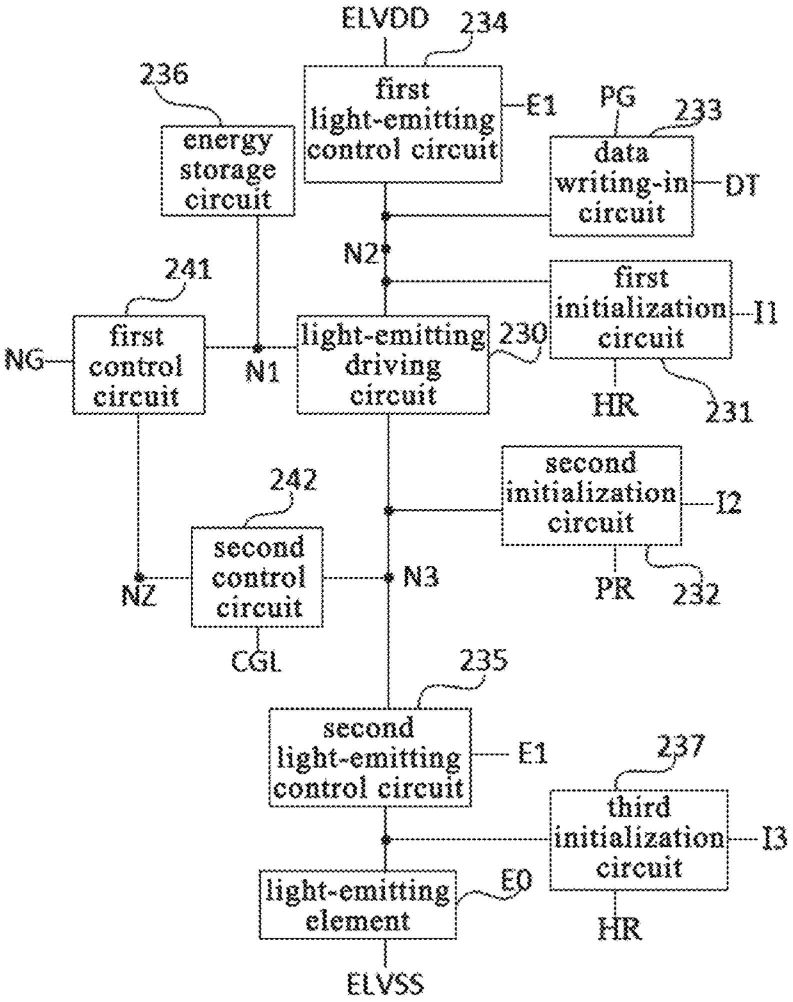
FIG. 23 is a structural diagram of the pixel circuit according to at least one embodiment of the present disclosure.

As shown in FIG. 23, on the basis of at least one embodiment of the pixel circuit shown in FIG. 21, the pixel circuit according to at least one embodiment of the present disclosure may further include a first initialization circuit 231, a second initialization circuit 232, a data writing-in circuit 233, a first light-emitting control circuit 234, a second light-emitting control circuit 235, an energy storage circuit 236 and a third initialization circuit 237;

the first initialization circuit 231 is electrically connected to the first initial control terminal HR, the first initial voltage terminal I1 and the second node N2 respectively, and is configured to write the first initial voltage Vinit1 provided by the first initial voltage terminal I1 into the second node N2 under the control of the first initial control signal provided by the first initial control terminal HR;

the second initialization circuit 232 is electrically connected to the second initial control terminal PR, the second initial voltage terminal I2 and the third node N3 respectively, and is configured to write the second initial voltage Vinit2 provided by the second initial voltage terminal I2 into the third node N3 under the control of the second initial control signal provided by the second initial control terminal PR;

the data writing-in circuit 233 is electrically connected to the second gate line PG, the data line DT and the second node N2 respectively, and is configured to write the data voltage Vdata provided by the data line DT into the second node N2 under the control of the second gate driving signal provided by the second gate line PG;

the first light-emitting control circuit 234 is electrically connected to the light-emitting control line E1, the power supply voltage terminal ELVDD and the second node N2 respectively, and is configured to control to connect or disconnect the power supply voltage terminal ELVDD and the second node N2 under the control of the light-emitting control signal provided by the light-emitting control line E1;

the second light-emitting control circuit 235 is electrically connected to the light-emitting control line E1, the third node N3 and the first electrode of the light-emitting element E0 respectively, and is configured to control to connect the third node N3 and the first electrode of the light-emitting element E0 under the control of the light-emitting control signal, and control to connect the second electrode of the light-emitting element E0 and the third voltage terminal V3;

the energy storage circuit 236 is electrically connected to the first node N1 and is configured to store electric energy;

the third initialization circuit 237 is electrically connected to the first initial control terminal HR, the third initial voltage terminal I3 and the first electrode of the light-emitting element E0 respectively, and is configured to write the third initial voltage Vinit3 provided by the third initial voltage terminal I3 into the first electrode of the light-emitting element E0 under the control of the first initial control signal provided by the first initial control terminal HR.

Figure 24:
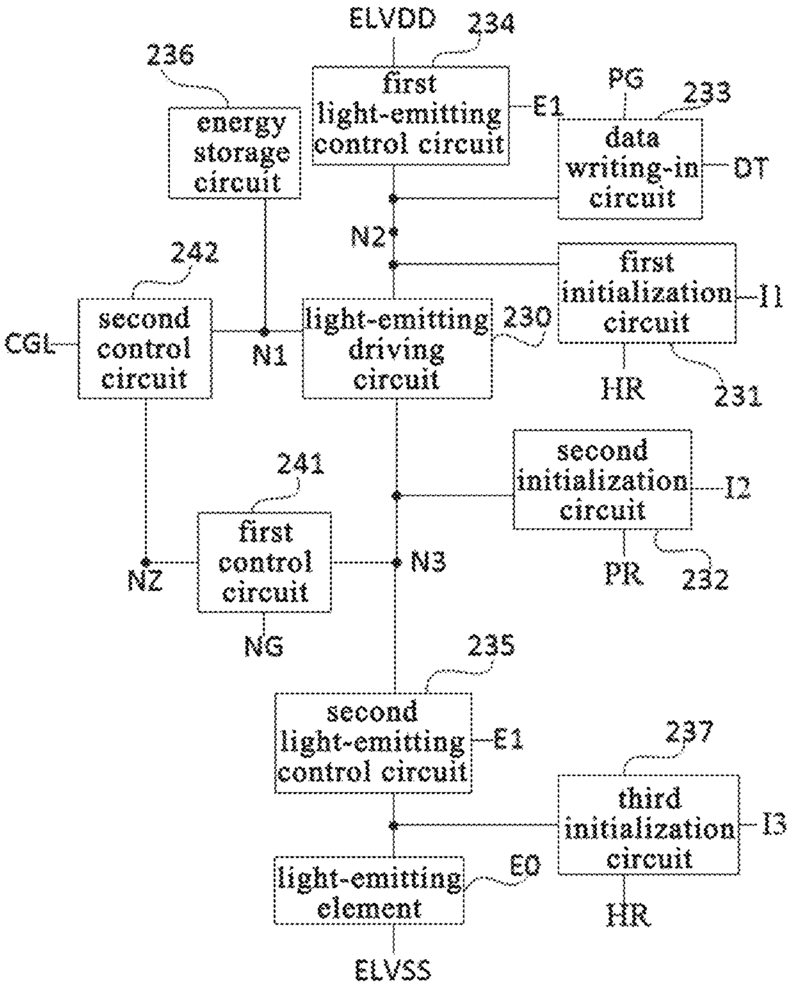
FIG. 24 is a structural diagram of the pixel circuit according to at least one embodiment of the present disclosure.

As shown in FIG. 24, on the basis of at least one embodiment of the pixel circuit shown in FIG. 22, the pixel circuit according to at least one embodiment of the present disclosure may further include a first initialization circuit 231, a second initialization circuit 232, a data writing-in circuit 233, a first light-emitting control circuit 234, a second light-emitting control circuit 235, an energy storage circuit 236 and a third initialization circuit 237;

the first initialization circuit 231 is electrically connected to the first initial control terminal HR, the first initial voltage terminal I1 and the second node N2 respectively, and is configured to write the first initial voltage Vinit1 provided by the first initial voltage terminal I1 into the second node N2 under the control of the first initial control signal provided by the first initial control terminal HR;

the second initialization circuit 232 is electrically connected to the second initial control terminal PR, the second initial voltage terminal I2 and the third node N3 respectively, and is configured to write the second initial voltage Vinit2 provided by the second initial voltage terminal I2 into the third node N3 under the control of the second initial control signal provided by the second initial control terminal PR;

the data writing-in circuit 233 is electrically connected to the second gate line PG, the data line DT and the second node N2 respectively, and is configured to write the data voltage Vdata provided by the data line DT into the second node N2 under the control of the second gate driving signal provided by the second gate line PG;

the first light-emitting control circuit 234 is electrically connected to the light-emitting control line E1, the power supply voltage terminal ELVDD and the second node N2 respectively, and is configured to control to connect or disconnect the power supply voltage terminal ELVDD and the second node N2 under the control of the light-emitting control signal provided by the light-emitting control line E1;

the second light-emitting control circuit 235 is electrically connected to the light-emitting control line E1, the third node N3 and the first electrode of the light-emitting element E0 respectively, and is configured to control to connect the third node N3 and the first electrode of the light-emitting element E0 under the control of the light-emitting control signal, and control to connect the second electrode of the light-emitting element E0 and the third voltage terminal V3;

the energy storage circuit 236 is electrically connected to the first node N1 and is configured to store electric energy;

the third initialization circuit 237 is electrically connected to the first initial control terminal HR, the third initial voltage terminal I3 and the first electrode of the light-emitting element E0 respectively, and is configured to write the third initial voltage Vinit3 provided by the third initial voltage terminal I3 into the first electrode of the light-emitting element E0 under the control of the first initial control signal provided by the first initial control terminal HR.

Optionally, the first initialization circuit includes a first initialization transistor;

a gate electrode of the first initialization transistor is electrically connected to the first initial control terminal, a first electrode of the first initialization transistor is electrically connected to the first initial voltage terminal, and a second electrode of the first initialization transistor is electrically connected to the second node.

Optionally, the second initialization circuit includes a second initialization transistor;

a gate electrode of the second initialization transistor is electrically connected to the second initial control terminal, a first electrode of the second initialization transistor is electrically connected to the second initial voltage terminal, and a second electrode of the second initialization transistor is electrically connected to the third node.

Optionally, the data writing-in circuit includes a writing-in transistor, the first light-emitting control circuit includes a first light-emitting control transistor, the second light-emitting control circuit includes a second light-emitting control transistor, the light-emitting driving circuit includes a driving transistor, and the energy storage circuit includes a storage capacitor;

a gate electrode of the writing-in transistor is electrically connected to the second gate line, a first electrode of the writing-in transistor is electrically connected to the data line, and a second electrode of the writing-in transistor is electrically connected to the second node;

a gate electrode of the first light-emitting control transistor is electrically connected to the light-emitting control line, a first electrode of the first light-emitting control transistor is electrically connected to the power supply voltage terminal, and a second electrode of the first light-emitting control transistor is electrically connected to the second node;

a gate electrode of the second light-emitting control transistor is electrically connected to the light-emitting control line, a first electrode of the second light-emitting control transistor is electrically connected to the third node, and a second electrode of the second light-emitting control transistor is electrically connected to the first electrode of the light-emitting element;

a gate electrode of the driving transistor is electrically connected to the first node, a first electrode of the driving transistor is electrically connected to the second node, and a second electrode of the driving transistor is electrically connected to the third node;

A first terminal of the storage capacitor is electrically connected to the first node, and a second terminal of the storage capacitor is electrically connected to the power supply voltage terminal.

Optionally, the third initialization circuit comprises a third initialization transistor;

a gate electrode of the third initialization transistor is electrically connected to the first initial control terminal, a first electrode of the third initialization transistor is electrically connected to the third initial voltage terminal, and a second electrode of the third initialization transistor is electrically connected to the first electrode of the light-emitting element.

Figure 25:
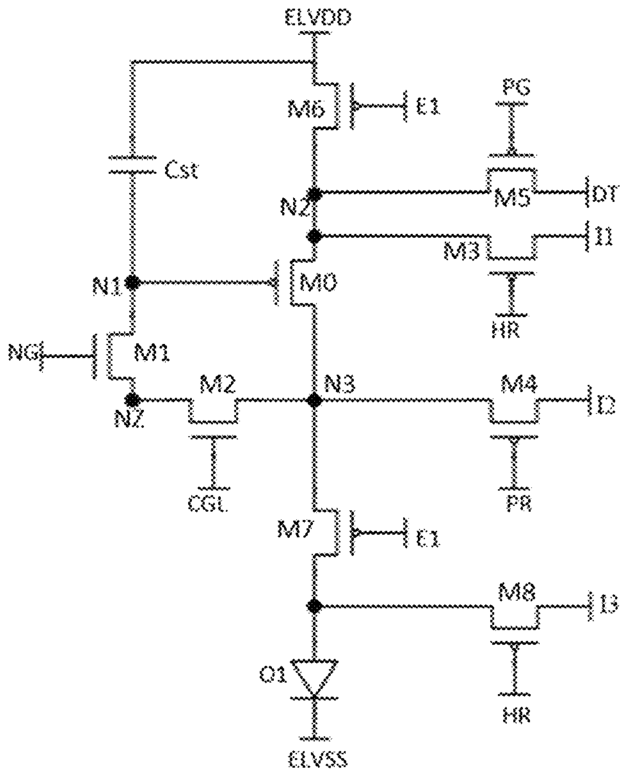
FIG. 25 is a circuit diagram of the pixel circuit according to at least one embodiment of the present disclosure.

As shown in FIG. 25, on the basis of at least one embodiment of the pixel circuit shown in FIG. 23, the first control circuit includes a first control transistor M1, the second control circuit includes a second control transistor M2, and the light-emitting driving circuit includes a driving transistor M0;

a gate electrode of the first control transistor M1 is electrically connected to the first gate line NG, a source electrode of the first control transistor M1 is electrically connected to the first node N1, and a second electrode of the first control transistor M1 is electrically connected to the intermediate node NZ;

a gate electrode of the second control transistor M2 is electrically connected to the scanning line CGL, a source electrode of the second control transistor M2 is electrically connected to the intermediate node NZ, and a drain electrode of the second control transistor M2 is electrically connected to the third node N3;

a gate electrode of the driving transistor M0 is electrically connected to the first node N1, a source electrode of the driving transistor M0 is electrically connected to the second node N2, and a drain electrode of the driving transistor M0 is electrically connected to the third node N3;

the first initialization circuit includes a first initialization transistor M3;

a gate electrode of the first initializing transistor M3 is electrically connected to the first initial control terminal HR, a source electrode of the first initializing transistor M3 is electrically connected to the first initial voltage terminal I1, a drain electrode of the first initializing transistor M3 is electrically connected to the second node N2, and the first initial voltage terminal I1 is configured to provide the first initial voltage Vinit1;

the second initialization circuit includes a second initialization transistor M4;

a gate electrode of the second initializing transistor M4 is electrically connected to the second initial control terminal PR, a source electrode of the second initializing transistor M4 is electrically connected to the second initial voltage terminal I2, a drain electrode of the second initializing transistor M4 is electrically connected to the third node N3, and the second initial voltage terminal I2 is configured to provide the second initial voltage Vinit2;

the data writing-in circuit includes a writing-in transistor M5, the first light-emitting control circuit includes a first light-emitting control transistor M6, the second light-emitting control circuit includes a second light-emitting control transistor M7, the energy storage circuit includes a storage capacitor Cst, and the light-emitting element is an organic light-emitting diode O1;

the gate electrode of the writing-in transistor M5 is electrically connected to the second gate line PG, the source electrode of the writing-in transistor M5 is electrically connected to the data line DT, and the drain electrode of the writing-in transistor M5 is electrically connected to the second node N2;

a gate electrode of the first light-emitting control transistor M6 is electrically connected to the light-emitting control line E1, a source electrode of the first light-emitting control transistor M6 is electrically connected to the power supply voltage terminal ELVDD, and a drain electrode of the first light-emitting control transistor M6 is electrically connected to the second node N2;

a gate electrode of the second light-emitting control transistor M7 is electrically connected to the light-emitting control line E1, a source electrode of the second light-emitting control transistor M7 is electrically connected to the third node N3, and a drain electrode of the second light-emitting control transistor M7 is electrically connected to the anode of the organic light-emitting diode O1;

a first terminal of the storage capacitor Cst is electrically connected to the first node N1, and a second terminal of the storage capacitor Cst is electrically connected to the power supply voltage terminal ELVDD;

the third initialization circuit includes a third initialization transistor M8;

a gate electrode of the third initialization transistor M8 is electrically connected to the first initial control terminal HR, a source electrode of the third initialization transistor M8 is electrically connected to the third initial voltage terminal I3, and a drain electrode of the third initialization transistor M8 is electrically connected to the anode of the organic light-emitting diode O1;

The cathode of the organic light-emitting diode O1 is electrically connected to the low-level terminal ELVSS.

In at least one embodiment of the pixel circuit shown in FIG. 25, M1 and M2 are n-type transistors, and the other transistors are p-type transistors, but are not limited to this.

Figure 26A:
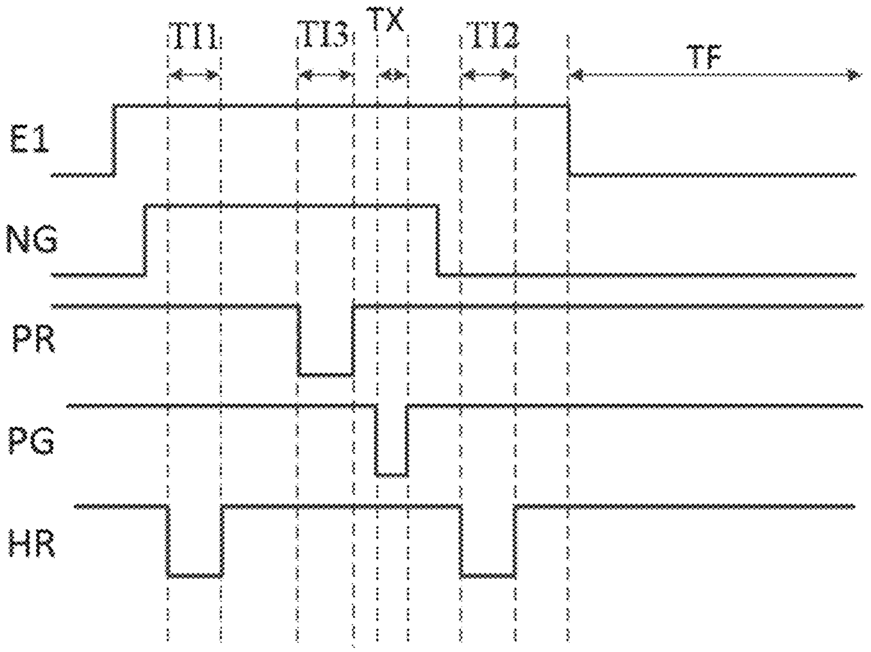
FIG. 26A is a working timing diagram of the pixel circuit shown in FIG. 25.

As shown in FIG. 26A, when at least one embodiment of the pixel circuit shown in FIG. 25 of the present disclosure is working, a frame of display time may include a first initialization time period TI1, a third initialization time period TI3, a data writing-in time period TX, a second initialization time period TI2 and a light-emitting time period TF set successively;

In the first initialization time period TI1, the third initialization time period TI3 and the data writing-in time period TX, NG outputs a high voltage signal to control to turn on M1;

In the first initialization time period TI1, the third initialization time period TI3, the data writing-in time period TX, and the second initialization time period TI2, E1 provides high voltage signals, and M6 and M7 are turned off;

In the second initialization time period TI2 and the light-emitting time period TF, NG output a low voltage signal to control to turn off M1;

in the first initialization time period TI1, HR outputs a low voltage signal, PR and PG both output high voltage signals, and M3 is turned on to write the first initial voltage Vinit1 provided by the first initial voltage terminal I1 into the second node N2, M0 is turned on to control to connect N2 and N3, M1 and M2 are turned on, to control to connect N1 and N3, so as to initialize the potential of the first node N1, the potential of the second node N2 and the potential of the third node N3 to reduce the subsequent charging difference;

In the third initialization time period TI3, PR outputs a low voltage signal, both HR and PG output a high voltage signal, and M4 is turned on to write the second initial voltage Vinit2 provided by I2 into the third node N3, so that M0 can be turned on at the beginning of the data writing-in time period TX;

In the data writing-in time period, TX, HR and PR all output high voltage signals, PG outputs low voltage signals, M5 is turned on, and DT provides data voltages Vdata to N2;

At the beginning of the data writing-in time period TX, M0 is turned on, and Vdata charges Cst until the potential of the first node N1 becomes Vdata+Vth, and M0 is turned off, where Vth is the threshold voltage of M0.

In the second initialization time period TI2, HR provides a low voltage signal, PR and PG both output a high voltage signal, M3 is turned on to write Vinit1 into the second node N2, M0 is turned on to connect N2 and N3, at this time, the potential of N1 is a small positive voltage, the potential of N2 and the potential of N3 are a higher positive voltage, M0 is in a bias state, and all the driver transistors included in the display panel are in a bias state, which can improve the hysteresis phenomenon.

In at least one embodiment of the present disclosure, the voltage value of Vinit1 may be positive, for example, the voltage value of Vinit1 may be greater than or equal to 4V and less than or equal to 7V;

The voltage value of Vinit2 and the voltage value of Vinit3 can be negative, for example, the voltage value of Vinit2 and the voltage value of Vinit3 can be greater than or equal to −5V and less than or equal to −3V;

But not limited to that.

When at least one embodiment of the pixel circuit shown in FIG. 25 of the present disclosure is operating, the potential of N1, the potential of N2 and the potential of N3 are set to the reference voltage during the first initialization time period, so that the data voltage of the previous frame of display time does not affect the writing of the data voltage of this frame in the data writing-in time period.

When at least one embodiment of the pixel circuit shown in FIG. 25 is operating, when the data voltage of the pixel circuit is not required to be refreshed, CG needs to be controlled to output a low voltage signal for at least part of the blank time period between two frames of display time, and CG continuously outputs a low voltage signal in the next frame of display time, to control M2 to turned off, so that no data voltage is written to maintain the display screen and not refresh the image;

When it is necessary to refresh the data voltage of the pixel circuit, it is necessary to control the CG to output a high voltage signal in at least part of the blank time period between the two frames of display time, and CG continuously outputs a high voltage signal in the next frame of display time, to control M2 to turn on and write the data voltage during the data writing-in time period to refresh the image.

In the working timing diagram shown in FIG. 26A, a frame of display time can be a refresh frame.

Figure 26B:
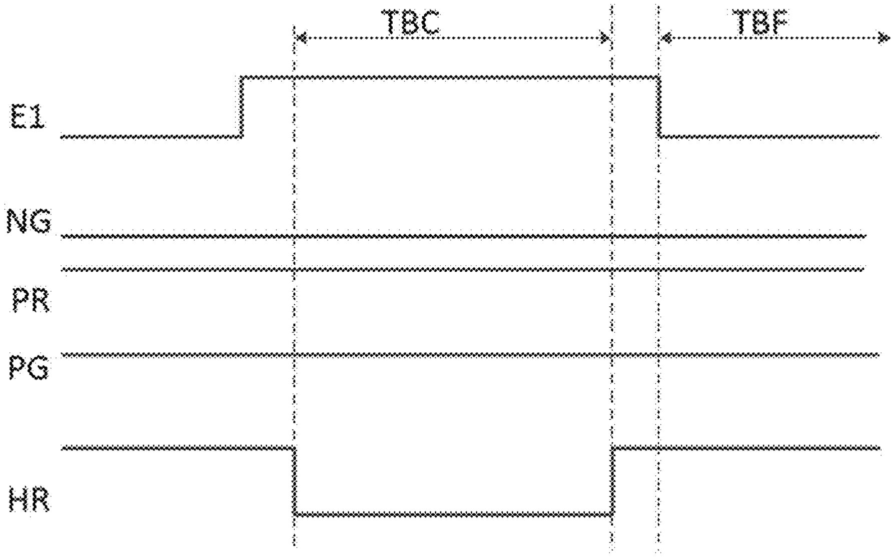
FIG. 26B is a working timing diagram of the pixel circuit shown in FIG. 25.

As shown in FIG. 26B, when at least one embodiment of the pixel circuit shown in FIG. 25 of the present disclosure is operating, the maintenance frame may include a maintenance initial time period TBC and a maintenance light-emitting time period TBF that are successively set;

In the maintenance initial time period TBC, HR outputs a low voltage signal, NG outputs a low voltage signal, PR and PG both output a high voltage signal, E1 provides a high voltage signal, M1 is turned off to control to disconnect N1 from N3, M6 and M7 are turned off, M5 is turned off, M3 and M8 are turned on, I1 provides the first initial voltage Vinit1 to the second node N2, the transistor M0 is driven to be turned on to control to connect N2 and N3, the potential of the second node N2 and the potential of the third node N3 are initialized, and the hysteresis phenomenon is improved; I3 provides the third initial voltage Vinit3 to the third node N3 and initialize the potential of the anode of O1 to control O1 not to emit light and remove the residual charge of the anode of O1.

In the maintenance light-emitting time period of TBF, E1 provides a low voltage signal, HR provides a high voltage signal, NG outputs a low voltage signal, PR and PG both output a high voltage signal, M1, M2, M3, M4, M5 and M8 are all turned off, M6 and M7 are turned on, and M0 drives O1 to emit light.

Figure 27:
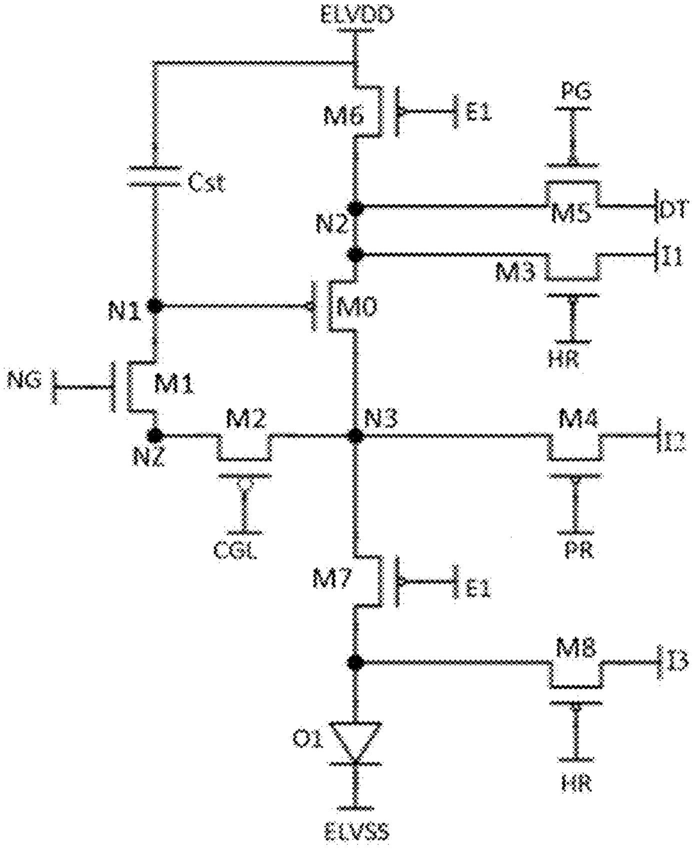
FIG. 27 is a circuit diagram of the pixel circuit according to at least one embodiment of the present disclosure.

The difference between at least one embodiment of the pixel circuit shown in FIG. 27 and at least one embodiment of the pixel circuit shown in FIG. 25 is that M2 is a p-type transistor.

When at least one embodiment of the pixel circuit shown in FIG. 27 is operating, when the data voltage of the pixel circuit is not required to refresh, it is necessary to control the CG to output a high voltage signal in at least part of the blank time period between the two frames of display time, and to continuously output a low voltage signal during the next frame of display time to control M2 to turn off, so that the data voltage is not written to maintain the display image and not refresh the image;

When it is necessary to refresh the data voltage of the pixel circuit, it is necessary to control the CG to output a low voltage signal in at least part of the blank time period between the two frames of display time, and to continuously output a high voltage signal in the next frame of display time CG to control M2 to turn on and write the data voltage in the data writing-in time period to refresh the image.

Figure 28:
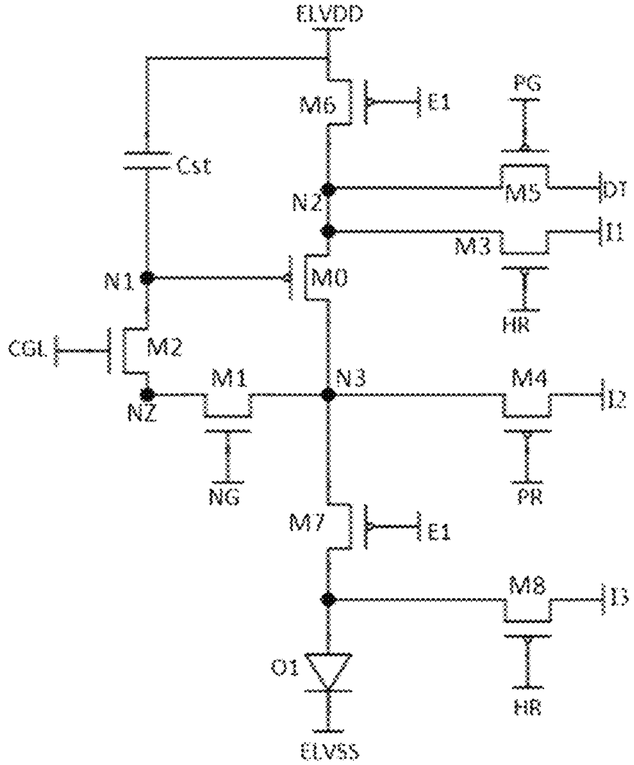
FIG. 28 is a circuit diagram of the pixel circuit according to at least one embodiment of the present disclosure.

The difference between at least one embodiment of the pixel circuit shown in FIG. 28 and at least one embodiment of the pixel circuit shown in FIG. 25 is that;

- the gate electrode of the first control transistor M1 is electrically connected to the first gate line NG, the source electrode of the first control transistor M1 is electrically connected to the intermediate node NZ, and the drain electrode of the first control transistor M1 is electrically connected to the third node N3;
- the gate electrode of the second control transistor M2 is electrically connected to the scanning line CGL, the source electrode of the second control transistor M2 is electrically connected to the first node N1, and the drain electrode of the second control transistor M2 is electrically connected to the intermediate node NZ.

In at least one embodiment of the pixel circuit shown in FIG. 28, both M1 and M2 are n-type transistors.

When at least one embodiment of the pixel circuit shown in FIG. 28 is operating, when the data voltage of the pixel circuit is not required to refresh, it is necessary to control the CG to output a low voltage signal in at least part of the blank time period between the two frames of display time, and to continuously output a low voltage signal in the next frame of display time CG to control M2 to turned off, so that the data voltage is not written to maintain the display image and not refresh the image;

When it is necessary to refresh the data voltage of the pixel circuit, it is necessary to control the CG to output a high voltage signal in at least part of the blank time period between the two frames of display time, and continuously output a high voltage signal in the next frame of display time CG to control M2 to turn on and write the data voltage in the data writing-in time period to refresh the image.

Figure 29:
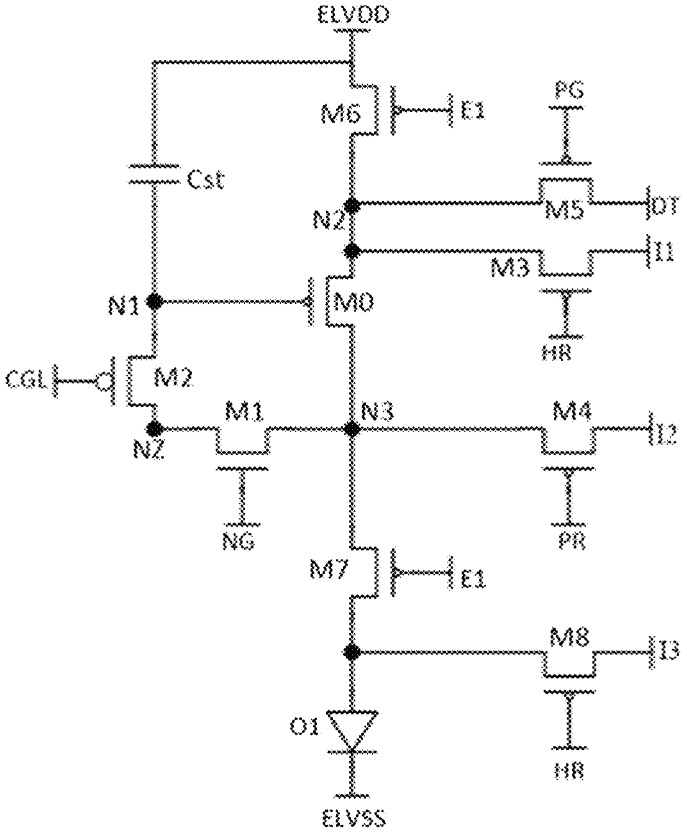
FIG. 29 is a circuit diagram of the pixel circuit according to at least one embodiment of the present disclosure.

The difference between at least one embodiment of the pixel circuit shown in FIG. 29 and at least one embodiment of the pixel circuit shown in FIG. 28 is that M2 is a p-type transistor.

When at least one embodiment of the pixel circuit shown in FIG. 29 is operating, when the data voltage of the pixel circuit is not required to refresh, it is necessary to control the CG to output a high voltage signal in at least part of the blank time period between the two frames of display time, and to continuously output a low voltage signal in the next frame of display time to control M2 to turn off, so that the data voltage is not written to maintain the display image and not refresh the image;

When it is necessary to refresh the data voltage of the pixel circuit, it is necessary to control the CG to output a low voltage signal in at least part of the blank time period between the two frames of display period, and to continuously output a high voltage signal in the next frame of display time CG to control M2 to turn on and write the data voltage in the data writing-in time period to refresh the image.

The pixel driving method of the embodiment of the present disclosure is applied to the pixel circuit, and the pixel driving method includes:

Generating, by the light-emitting driving circuit, a driving current flowing through the second node and the third node under the control of the potential of the first node;

Controlling, by the control circuit, to connect or disconnect the first node and the third node under the control of the first gate driving signal and the scanning signal.

In at least one embodiment of the present disclosure, the pixel circuit includes a first initialization circuit, and the display period includes a first initial time period and a second initial time period successively set; the pixel driving method includes:

in the first initialization time period, controlling, by the control circuit, to connect the first node and the third node under the control of the first gate driving signal and the scanning signal; writing, by the first initialization circuit, the first initial voltage into the second node under the control of the first initial control signal;

In the second initialization time period, controlling, by the control circuit, to disconnect the first node from the third node under the control of the first gate driving signal and the scanning signal; writing, by the first initialization circuit, the first initial voltage into the second node under the control of the first initial control signal; and controlling, by the light-emitting driving circuit, to connect the second node and the third node under the control of the potential of the first node.

The display panel of the embodiment of the present disclosure includes a source driver and a driving circuit;

The source driver includes a plurality of data output terminals.

the display panel according to at least one embodiment of the present disclosure includes a plurality of columns of data lines and a plurality of columns of scanning lines;

The scanning signal output terminal in the scanning signal generation circuit in the driving circuit is electrically connected to the scanning line.

In the specific embodiment, the display panel may include a plurality of columns of scanning lines, and the scanning signal output terminal is electrically connected to the scanning line to provide a scanning signal to the scanning line.

Optionally, the display panel includes a plurality of columns of scanning lines and a plurality of columns of pixel circuits;

A column of scanning line is electrically connected to the two columns of pixel circuits.

In the specific embodiment, the two columns of the pixel circuits can share a column of scanning line, so as to save the pixel layout space.

In at least one embodiment of the present disclosure, the data output terminal is directly electrically connected to the data line;

The driving circuit includes a second switching circuit, and the second switching circuit controls to connect or disconnect the data output terminal and the data line under the control of the second gating control signal.

Optionally, the source driver is arranged on a first side of the display panel, and the driving circuit is arranged on the first side of the display panel;

the source driver is arranged on the first side of the display panel, the driving circuit is arranged on a second side of the display panel, and the first side is opposite to the second side.

For example, the first side may be a lower side, and the second side may be an upper side, but is not limited to this.

Figure 30:
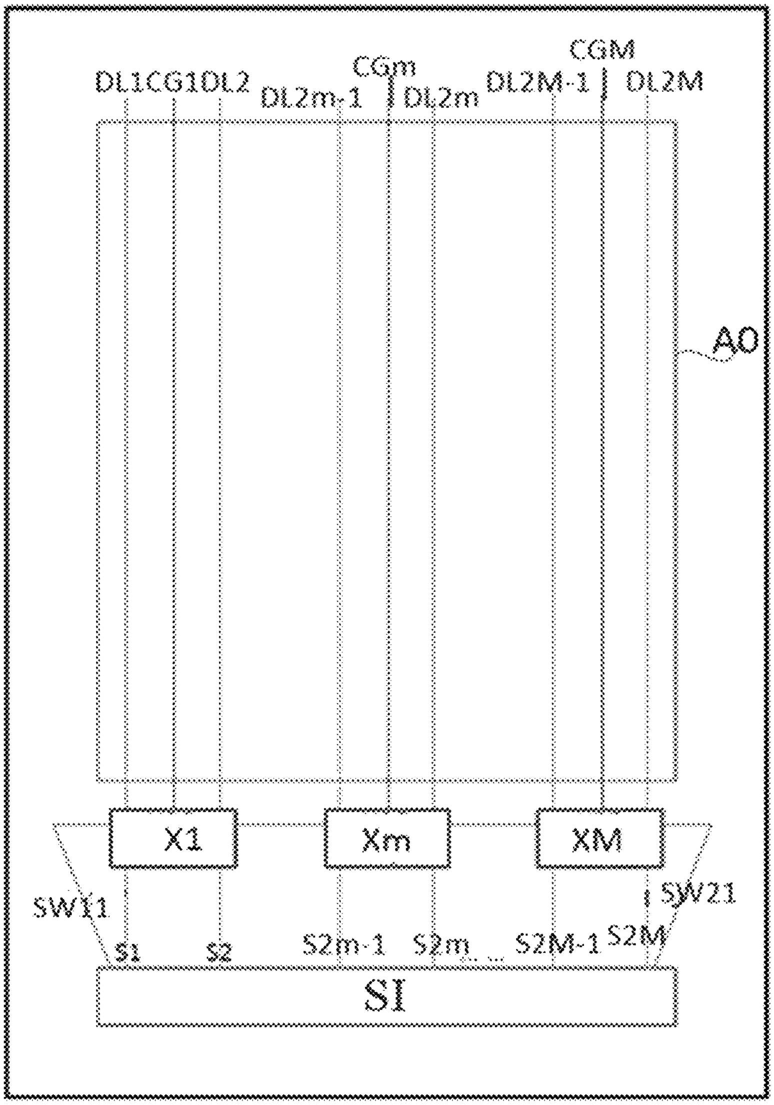
FIG. 30 is a structural diagram of the display panel according to at least one embodiment of the present disclosure.

As shown in FIG. 30, the display area of the display panel is labeled A0;

the first column of data line is labeled DL1, the first column of scanning line is labeled CG1, the second column of data line is labeled DL2, the (2m−1)th column of data line is labeled DL2*m*−1, the 2mth column of data line is labeled DL2*m*, the mth column of scanning line is labeled CGm, the (2M−1)th column of data line is labeled DL2M−1, the 2Mth column of data line is labeled DL2M, the Mth column of data line is labeled CGM, and both m and M are positive integers;

the source driver is labeled S1;

the first data output terminal of the source driver S1 is labeled S1, the second data output terminal of the source driver S1 is labeled S2, the (2m−1)th data output terminal of the source driver S1 is labeled S2*m*−1, the 2mth data output terminal of the source driver S1 is labeled S2*m*, the first first gating control line is labeled SW11, and the second first gating control line is labeled SW21;

The source driver S1 is electrically connected to SW11 and SW21 and is used to provide the first first gating control signal for SW11 and the second first gating control signal for SW21;

In FIG. 30, the first gating unit is labeled X1, the mth gating unit is labeled 20*m*, and the M gating unit is labeled 20M;

Each gating unit includes a first switching circuit and a scanning signal generation circuit; or, each gating unit includes a first switching circuit, a second switching circuit and a scanning signal generation circuit.

As shown in FIG. 30, the first gating unit X1 is electrically connected to DL1, DL2 and CG1 respectively, the mth gating unit Xm is electrically connected to DL2*m*−1, DL2*m* and CGm respectively, and the Mth gating unit XM is electrically connected to DL2M−1, DL2M and CGM respectively;

The source driver S1 is arranged below A0, and the first gating unit X1, the mth gating unit Xm and the Mth gating unit XM are arranged below A0.

Figure 31:
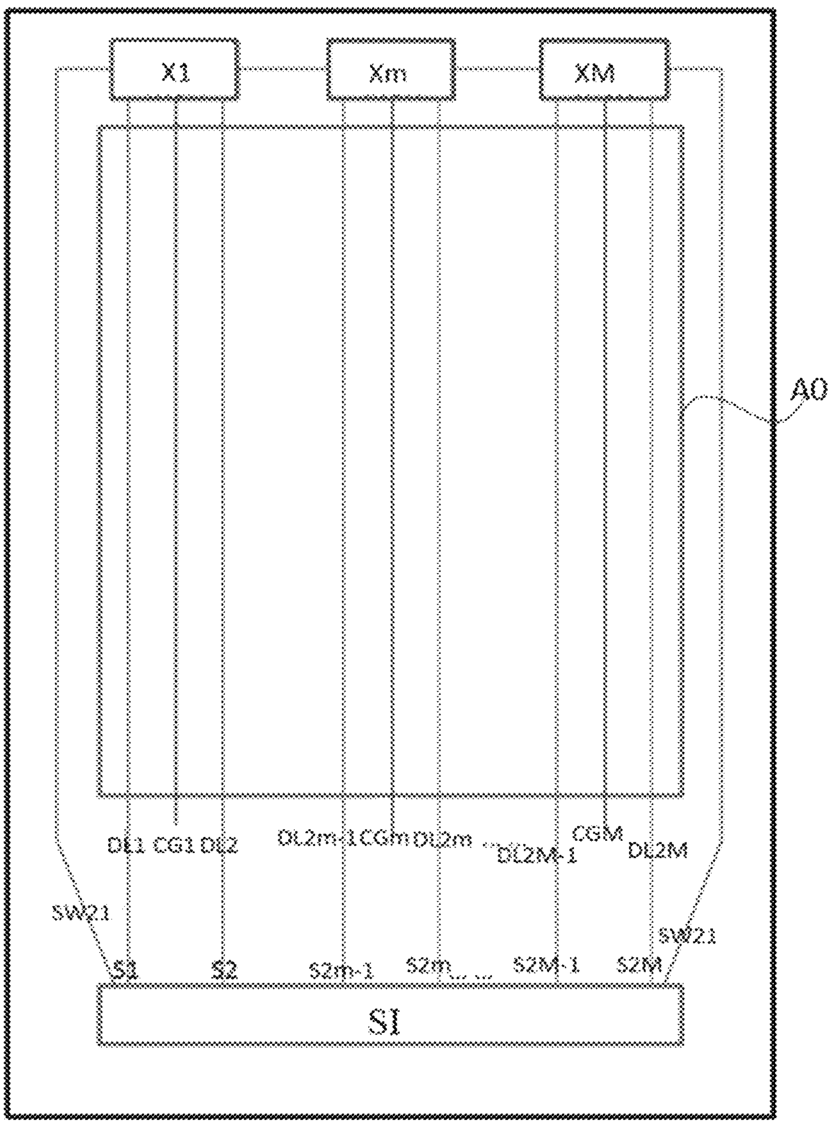
FIG. 31 is a structural diagram of the display panel according to at least one embodiment of the present disclosure.

The difference between at least one embodiment of the display panel shown in FIG. 31 and at least one embodiment of the display panel shown in FIG. 30 is that; the first gating unit X1, the mth gating unit Xm and the Mth gating unit XM are arranged above A0.

Figure 32:
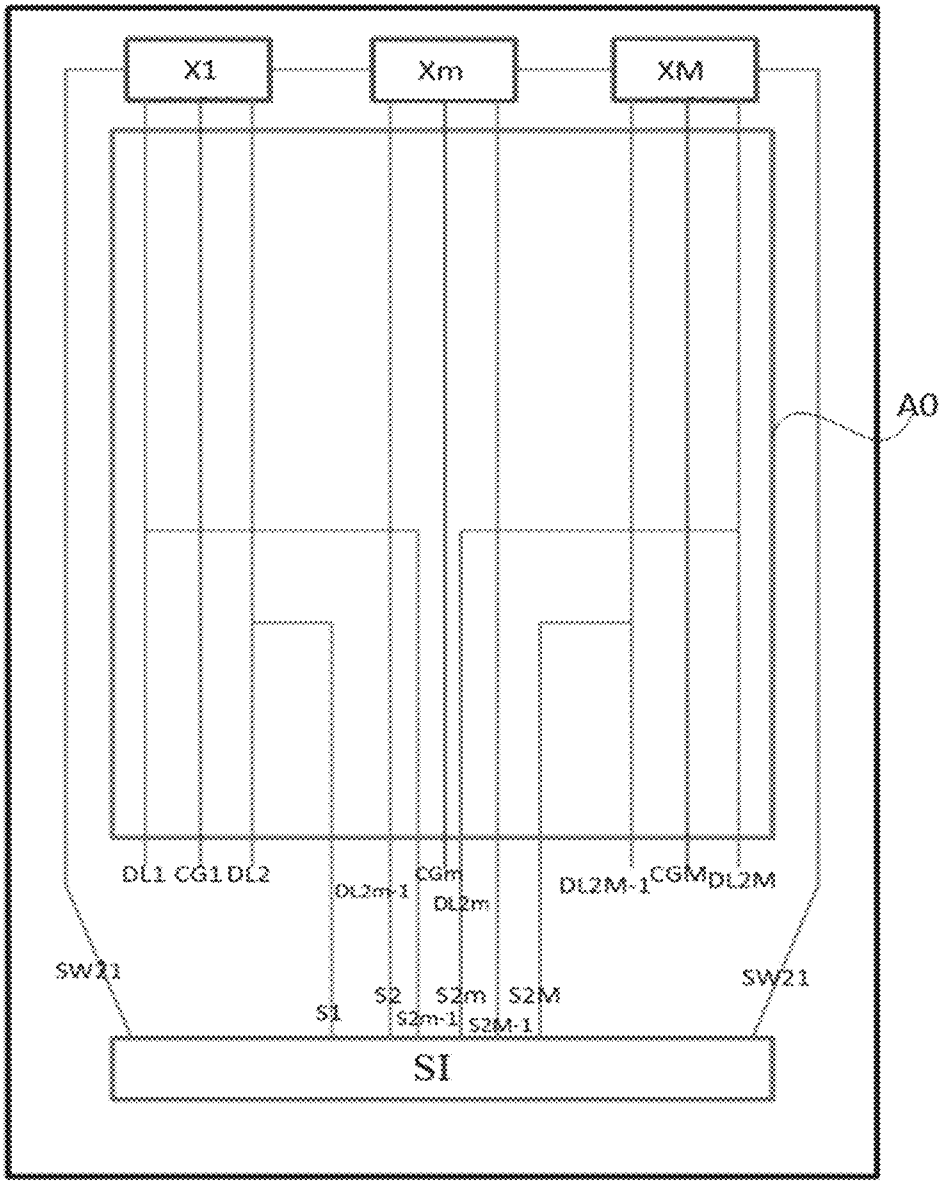
FIG. 32 is a structural diagram of the display panel according to at least one embodiment of the present disclosure.

The difference between at least one embodiment of the display panel shown in FIG. 32 and at least one embodiment of the display panel shown in FIG. 31 is that:

Each data output terminal of the source driver S1 is in the middle of the display panel to achieve a narrow lower bezel, and at least one embodiment of the display panel shown in FIG. 22 is combined with a FIP (Fanout In Pixel) embodiment. The display panel according to at least one embodiment of the present disclosure may also include a plurality of rows and a plurality of columns of pixel circuits.

In at least one embodiment of the present disclosure, two columns of pixel circuits may be electrically connected to the same column of scanning line.

Figure 33:
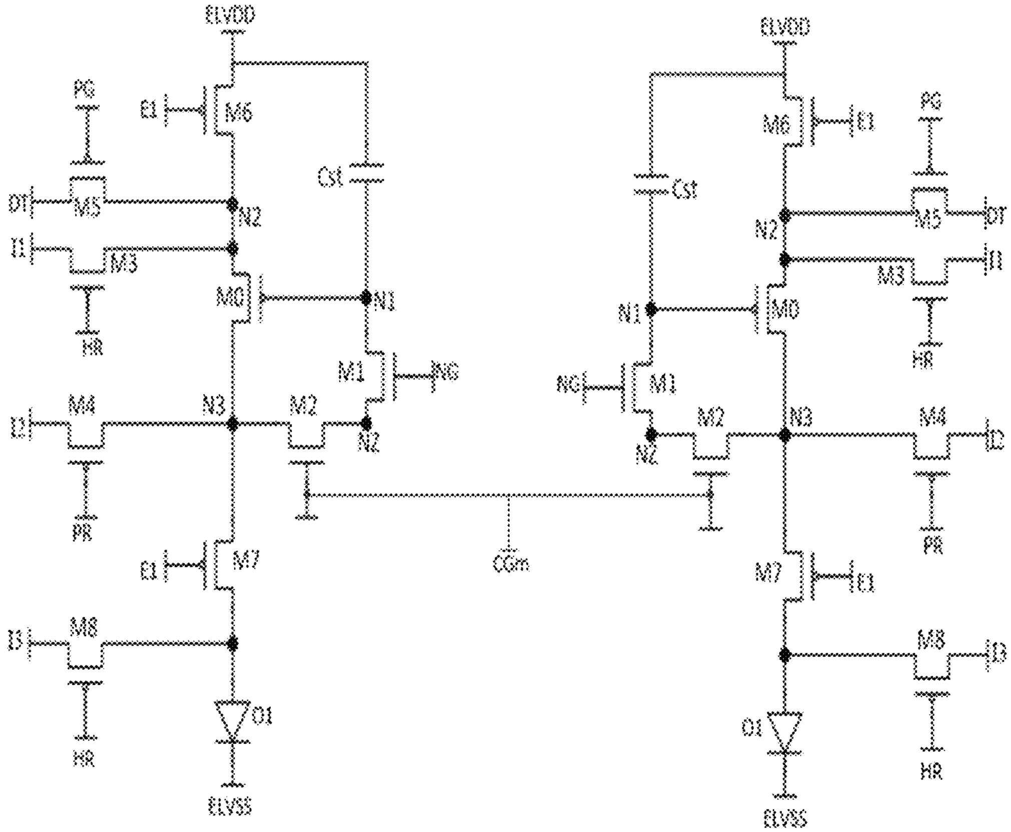
FIG. 33 is a schematic diagram of two pixel circuits sharing the scanning line.

As shown in FIG. 33, at least one embodiment of two pixel circuits shown in FIG. 25 may share the mth column of scanning line CGm.

Figure 34:
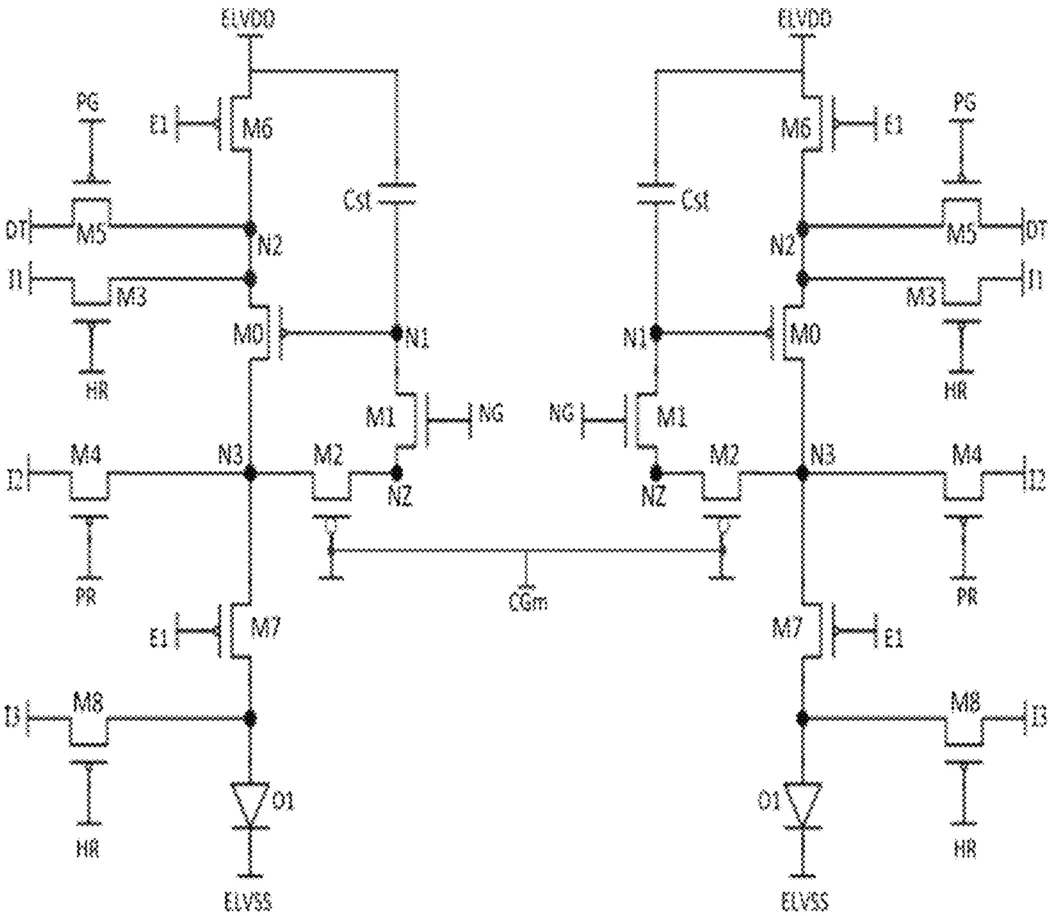
FIG. 34 is a schematic diagram of two pixel circuits sharing the scanning line.

As shown in FIG. 34, at least one embodiment of two pixel circuits shown in FIG. 27 can share the mth column of scanning line CGm.

Figure 35:
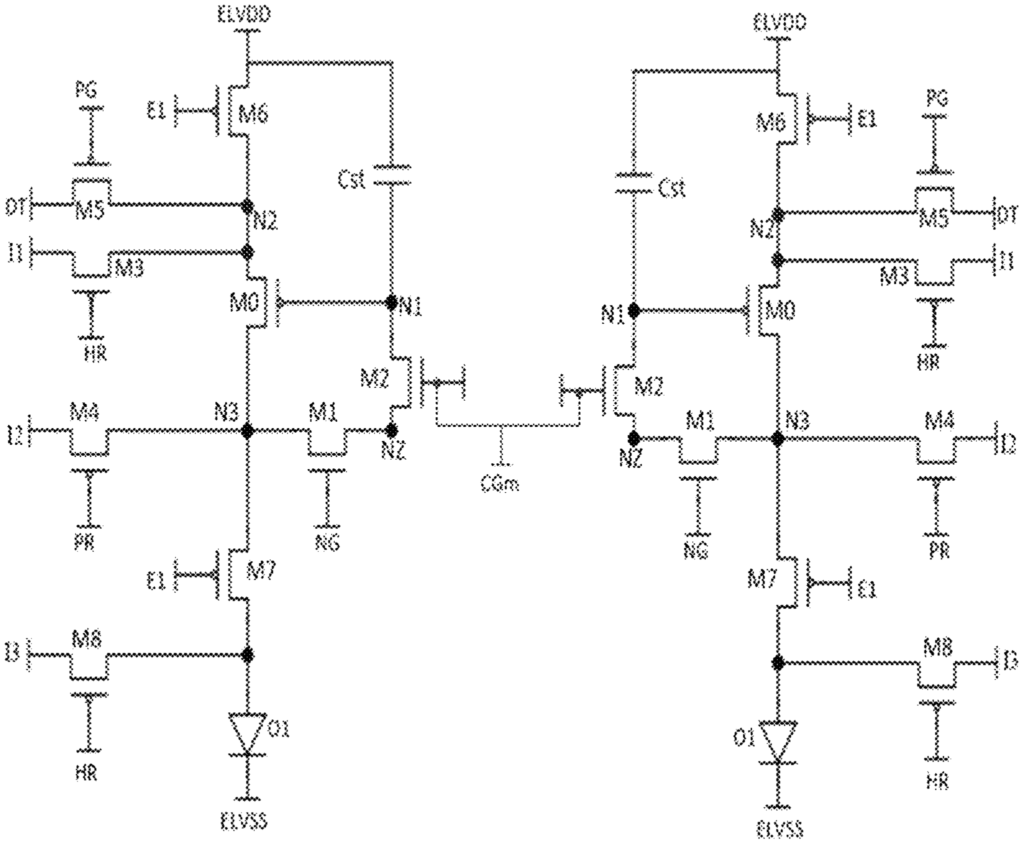
FIG. 35 is a schematic diagram of two pixel circuits sharing the scanning line.

As shown in FIG. 35, at least one embodiment of two pixel circuits shown in FIG. 28 may share the mth column of scanning line CGm.

Figure 36:
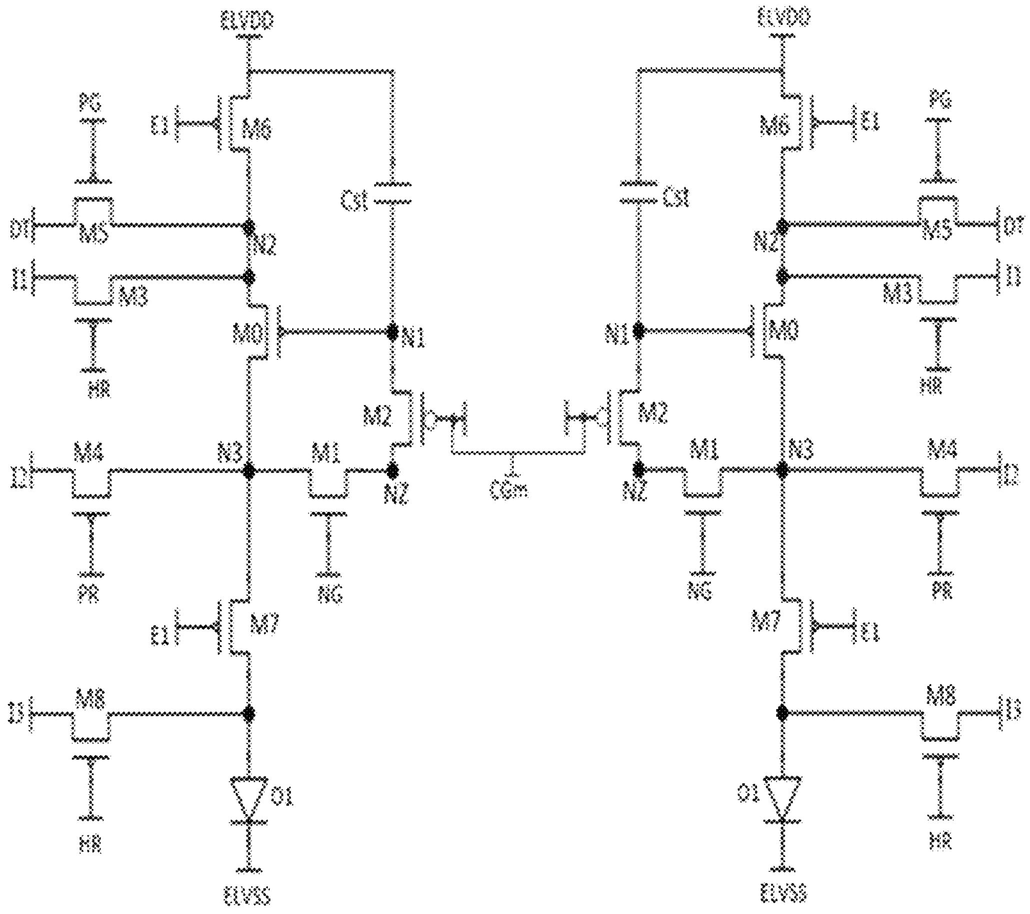
FIG. 36 is a schematic diagram of two pixel circuits sharing the scanning line.

As shown in FIG. 36, at least one embodiment of two pixel circuits shown in FIG. 29 may share the mth column of scanning line CGm.

The embodiment of the present disclosure provides a driving scheme applied to an OLED display, a local refresh pixel circuit is cooperated with a source driving circuit and a driving scheme, and the partial image can be updated through an HCT control signal (the HCT control signal can be a data signal provided by the source driver through its data output terminal during a blank time period), and the rest of the image does not need to be charged and discharged multiple times, thereby further reducing the power consumption of the OLED display, or realizing ultra-low power consumption through the partial update of the display image.

In at least one embodiment of the present disclosure, when it is necessary to update part of the image for a display device, such as only the date and time part needs to be updated. In the row direction, the gate driving circuit can be controlled whether to output or not: in the row that needs to update the image, the first gate driving signal is normally output, and the first control transistor in the pixel circuit in the control display area is turned on normally and the data is updated; in the row that does not need to update the image, the potential of the first gate driving signal is always maintained to turn off the first control transistor, and the pixel brightness is guaranteed to remain unchanged, so that the local refresh in the row direction is realized. In the column direction, it can be achieved by controlling whether the column scanning line turns on the second control transistor in the pixel circuit: in the blank period between the two frames of display time, the source driver outputs HCT pulse, and writes a different scanning signal to the column scanning line, if the current column needs to be updated, the column scanning line needs to ensure that the second control transistor is always turned on, so that the current column can be refreshed normally, and if some columns do not need to be updated, the column scanning line needs to ensure that the second control transistors in these columns of pixel circuits are always turned off.

The display device the in the embodiment of the disclosure includes the display panel.

The above descriptions are implementations of the present disclosure. It should be pointed out that those skilled in the art can make some improvements and modifications without departing from the principle of the present disclosure. These improvements and modifications shall also fall within the scope of the present disclosure.

What is claimed is:

1. A driving circuit, comprising a first switching circuit and a scanning signal generation circuit; wherein the first switching circuit is electrically connected to a first gating control line, at least two data output terminals of a source driver and the scanning signal generation circuit, and is configured to write a data signal provided by the at least two data output terminals into the scanning signal generation circuit under the control of a first gating control signal provided by the first gating control line;

the scanning signal generation circuit is configured to generate a scanning signal according to the data signal, and output the scanning signal through the scanning signal output terminal;

wherein the at least two data output terminals are electrically connected to different columns of data lines included in a display panel respectively;

a scanning signal output terminal of the scanning signal generation circuit is electrically connected to a column of scanning line included in the display panel.

2. The driving circuit according to claim 1, wherein the driving circuit further comprises a second switching circuit;

the second switching circuit is electrically connected to a second gating control line, the at least two data output terminals of the source driver and at least two data lines included in a display panel respectively, and is configured to control to connect or disconnect the at least two data output terminals of the source driver and a column of data line included in the display panel respectively under the control of a second gating control signal provided by the second gating control line;

the first gating control line is a same gating control line as the second gating control line, or the first gating control line is different from the second gating control line.

3. The driving circuit according to claim 1, wherein the first switching circuit is respectively electrically connected to the first gating control line, a (2m−1)th data output terminal of the source driver, a 2mth data output terminal of the source driver, a first control node and a second control node, is configured to control to connect or disconnect the (2m−1)th data output terminal and the first control node and control to connect or disconnect the 2mth data output terminal and the second control node under the control of the first gating control signal provided by the first gating control line;

m is a positive integer.

4. The driving circuit according to claim 3, wherein the first switching circuit includes a first transistor, a second transistor, a first capacitor and a second capacitor;

a gate electrode of the first transistor is electrically connected to the first gating control line, a first electrode of the first transistor is electrically connected to the (2m−1)th data output terminal, and a second electrode of the first transistor is electrically connected to the first control node;

a gate electrode of the second transistor is electrically connected to the first gating control line, a first electrode of the second transistor is electrically connected to the 2mth data output terminal, and a second electrode of the second transistor is electrically connected to the second control node;

a first terminal of the first capacitor is electrically connected to the first control node, and a second terminal of the first capacitor is electrically connected to a control voltage terminal;

a first terminal of the second capacitor is electrically connected to the second control node, and a second terminal of the second capacitor is electrically connected to the control voltage terminal.

5. The driving circuit according to claim 3, wherein the scanning signal generation circuit includes an output control circuit and a first output circuit;

the output control circuit is electrically connected to the first control node, a first voltage terminal, a second voltage terminal, an output control terminal and a scanning output terminal respectively, is configured to control to connect or disconnect the output control terminal and the first voltage terminal under the control of a potential of the first control node, and control to connect or disconnect the output control terminal and the second voltage terminal under the control of a signal provided by the scanning output terminal;

the first output circuit is electrically connected to the second control node, the output control terminal, the scanning output terminal, the first voltage terminal and the second voltage terminal respectively, and is configured to control to connect or disconnect the scanning output terminal and the first voltage terminal under the control of a potential of the second control node, and control to connect or disconnect the scanning output terminal and the second voltage terminal under the control of a potential of the output control terminal.

6. The driving circuit according to claim 5, wherein the scanning output terminal is the scanning signal output terminal; or the scanning signal generation circuit further includes an inverting circuit; an input terminal of the inverting circuit is electrically connected to the scanning output terminal, an output terminal of the inverting circuit is electrically connected to the scanning signal output terminal, and the inverting circuit is configured to perform phase inversion on a voltage signal that is connected to the input terminal of the inverting circuit, obtains an inverted voltage signal, and outputs the inverted voltage signal through the output terminal of the inverting circuit.

7. The driving circuit according to claim 5, wherein the output control circuit includes a third transistor and a fourth transistor;

a gate electrode of the third transistor is electrically connected to the first control node, a first electrode of the third transistor is electrically connected to the first voltage terminal, and a second electrode of the third transistor is electrically connected to the output control terminal;

a gate electrode of the fourth transistor is electrically connected to the scanning output terminal, a first electrode of the fourth transistor is electrically connected to the output control terminal, and a second electrode of the fourth transistor is electrically connected to the second voltage terminal;

the output circuit includes a fifth transistor and a sixth transistor;

a gate electrode of the fifth transistor is electrically connected to the second control node, a first electrode of the fifth transistor is electrically connected to the first voltage terminal, and a second electrode of the fifth transistor is electrically connected to the scanning output terminal;

a gate electrode of the sixth transistor is electrically connected to the output control terminal, a first electrode of the sixth transistor is electrically connected to the scanning output terminal, and a second electrode of the sixth transistor is electrically connected to the second voltage terminal.

8. The driving circuit according to claim 3, wherein the scanning signal generation circuit includes a first output control circuit, a second output control circuit, a third output control circuit, a fourth output control circuit and a second output circuit;

the first output control circuit is electrically connected to the first control node, a third control node and a connection node respectively, and is configured to control to connect or disconnect the third control node and the connection node under the control of the potential of the first control node;

the second output control circuit is electrically connected to the second control node, a fourth control node and the connection node respectively, and is configured to control to connect or disconnect the fourth control node and the connection node under the control of a potential of the second control node;

the third output control circuit is electrically connected to the scanning output terminal, an output control terminal, a first voltage terminal and the third control node respectively, and is configured to control to connect or disconnect the output control terminal and the first voltage terminal under the control of a signal provided by the scanning output terminal, and control to connect or disconnect the output control terminal and the third control node;

the fourth output control circuit is electrically connected to the output control terminal, the scanning output terminal, the first voltage terminal and the fourth control node respectively, and is configured to control to connect or disconnect the scanning output terminal and the first voltage terminal, and control to connect or disconnect the scanning output terminal and the fourth control node under the control of the output control signal provided by the output control terminal;

the second output circuit is electrically connected to the scanning output terminal, the first voltage terminal, the second voltage terminal and the scanning signal output terminal respectively, is configured to control to connect or disconnect the scanning signal output terminal and the first voltage terminal, and control to connect or disconnect the scanning signal output terminal and the second voltage terminal under the control of the signal provided by the scanning output terminal.

9. The driving circuit according to claim 8, wherein the connection node is electrically connected directly to the second voltage terminal; or the scanning signal generation circuit further includes a connection control circuit, a fifth output control circuit and a sixth output control circuit;

the connection control circuit is electrically connected to a third gating control line, the connection node and the second voltage terminal respectively, and is configured to control to connect or disconnect the connection node and the second voltage terminal under the control of a third gating control signal provided by the third gating control line;

the fifth output control circuit is electrically connected to the third gating control line, the first voltage terminal and the output control terminal respectively, and is configured to control to connect the first voltage terminal and the output control terminal under the control of the third gating control signal;

the sixth output control circuit is electrically connected to the third gating control line, the first voltage terminal and the scanning output terminal respectively, and is configured to control to connect the first voltage terminal and the scanning output terminal under the control of the third gating control signal.

10. The driving circuit according to claim 8, wherein the first output control circuit includes a seventh transistor, and the second output control circuit includes an eighth transistor;

a gate electrode of the seventh transistor is electrically connected to the first control node, a first electrode of the seventh transistor is electrically connected to the third control node, and a second electrode of the seventh transistor is electrically connected to the second voltage terminal;

a gate electrode of the eighth transistor is electrically connected to the second control node, a first electrode of the eighth transistor is electrically connected to the fourth control node, and a second electrode of the eighth transistor is electrically connected to the second voltage terminal;

the third output control circuit includes a ninth transistor and a tenth transistor;

a gate electrode of the ninth transistor is electrically connected to the scanning output terminal, a first electrode of the ninth transistor is electrically connected to the first voltage terminal, and a second electrode of the ninth transistor is electrically connected to the output control terminal;

a gate electrode of the tenth transistor is electrically connected to the scanning output terminal, a first electrode of the tenth transistor is electrically connected to the output control terminal, and a second electrode of the tenth transistor is electrically connected to the third control node;

the fourth output control circuit includes an eleventh transistor and a twelfth transistor;

a gate electrode of the eleventh transistor is electrically connected to the output control terminal, a first electrode of the eleventh transistor is electrically connected to the first voltage terminal, and a second electrode of the eleventh transistor is electrically connected to the scanning output terminal;

a gate electrode of the twelfth transistor is electrically connected to the output control terminal, a first electrode of the twelfth transistor is electrically connected to the scanning output terminal, and a second electrode of the twelfth transistor is electrically connected to the fourth control node;

the second output circuit includes a thirteenth transistor and a fourteenth transistor;

a gate electrode of the thirteenth transistor is electrically connected to the scanning output terminal, a first electrode of the thirteenth transistor is electrically connected to the first voltage terminal, and a second electrode of the thirteenth transistor is electrically connected to the scanning signal output terminal;

a gate electrode of the fourteenth transistor is electrically connected to the scanning output terminal, a first electrode of the fourteenth transistor is electrically connected to the scanning signal output terminal, and a second electrode of the fourteenth transistor is electrically connected to the second voltage terminal.

11. The driving circuit according to claim 9, wherein the connection control circuit includes a fifteenth transistor, the fifth output control circuit includes a sixteenth transistor, and the sixth output control circuit includes a seventeenth transistor;

a gate electrode of the fifteenth transistor is electrically connected to the third gating control line, a first electrode of the fifteenth transistor is electrically connected to the connection node, and a second electrode of the fifteenth transistor is electrically connected to the second voltage terminal;

a gate electrode of the sixteenth transistor is electrically connected to the third gating control line, a first electrode of the sixteenth transistor is electrically connected to the first voltage terminal, and a second electrode of the sixteenth transistor is electrically connected to the output control terminal;

a gate electrode of the seventeenth transistor is electrically connected to the third gating control line, a first electrode of the seventeenth transistor is electrically connected to the first voltage terminal, and a second electrode of the seventeenth transistor is electrically connected to the scanning output terminal.

12. A driving method applied to the driving circuit according to claim 1, wherein the driving method comprises: in at least part of a blank time period between two frames of display time;

controlling, by the first switching circuit, to write the data signal provided by the at least two data output terminals of the source driver into the scanning signal generation circuit under the control of the first gating control signal;

generating, by the scanning signal generation circuit, the scanning signal according to the data signal provided by the at least two data output terminals, and outputting the scanning signal to a corresponding column of scanning line of a display panel through the scanning signal output terminal.

13. The driving method according to claim 12, wherein at least two data output terminals are electrically connected to different columns of data lines included in the display panel respectively;

the driving method further includes:

in a data writing-in time period in a frame of display time, providing, by the data output terminal, a data voltage to a data line that is electrically connected to the date output terminal.

14. The driving method according to claim 12, wherein the driving circuit further includes a second switching circuit;

the driving method further includes:

in a data writing-in time period in a frame of display time, controlling, by the second switching circuit, to connect or disconnect the data output terminal of the source driver and the corresponding column of data line of the display panel under the control of the second gating control signal.

* * * * *